(12) United States Patent
Kim et al.

(10) Patent No.: US 12,341,637 B2
(45) Date of Patent: Jun. 24, 2025

(54) METHOD OF PERFORMING PHASE NOISE COMPENSATION BY A USER EQUIPMENT (UE) AND APPARATUS USING THE SAME

(71) Applicant: LG ELECTRONICS INC., Seoul (KR)

(72) Inventors: Sunam Kim, Seoul (KR); Sungho Park, Seoul (KR); Jaehwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 359 days.

(21) Appl. No.: 17/911,583

(22) PCT Filed: Mar. 18, 2020

(86) PCT No.: PCT/KR2020/003713
§ 371 (c)(1),
(2) Date: Sep. 14, 2022

(87) PCT Pub. No.: WO2021/187637
PCT Pub. Date: Sep. 23, 2021

(65) Prior Publication Data
US 2023/0113691 A1    Apr. 13, 2023

(51) Int. Cl.
*H04L 27/26* (2006.01)
*H04L 5/00* (2006.01)
*H04L 25/03* (2006.01)
*H04W 72/0446* (2023.01)

(52) U.S. Cl.
CPC ...... *H04L 27/26025* (2021.01); *H04L 5/0051* (2013.01); *H04L 27/2605* (2013.01); *H04L 27/2678* (2013.01); *H04L 25/03012* (2013.01); *H04L 27/2666* (2013.01); *H04L 27/2671* (2013.01); *H04W 72/0446* (2013.01)

(58) Field of Classification Search
CPC .......... H04L 27/26025; H04L 27/2666; H04L 27/2678; H04L 25/03012; H04L 27/2671; H04W 72/0446
See application file for complete search history.

(56) References Cited

U.S. PATENT DOCUMENTS

| | | | |
|---|---|---|---|
| 2018/0367277 A1* | 12/2018 | Zhang | .................. H04L 5/0005 |
| 2019/0215118 A1* | 7/2019 | Molés Cases | .... H04W 72/0453 |
| 2019/0296877 A1 | 9/2019 | Zhang et al. | |
| 2020/0077419 A1* | 3/2020 | Lee | ........................ H04L 5/0041 |

(Continued)

FOREIGN PATENT DOCUMENTS

| | | |
|---|---|---|
| EP | 3606237 | 2/2020 |
| KR | 1020190101454 | 8/2019 |

(Continued)

OTHER PUBLICATIONS

R1-1707367, "On PTRS for DFT-s-OFDM", May 15-19, 2017, pp. 1-6 (Year: 2017).*

(Continued)

*Primary Examiner* — Salvador E Rivas
(74) *Attorney, Agent, or Firm* — BRYAN CAVE LEIGHTON PAISNER LLP

(57) ABSTRACT

Provided are a method for estimating and compensating for phase noise using a phase tracking reference signal in a wireless communication system, and an apparatus using the method.

10 Claims, 39 Drawing Sheets

(56) References Cited

U.S. PATENT DOCUMENTS

2021/0044372 A1* 2/2021 Yang .................. H04L 27/2613
2022/0247604 A1* 8/2022 Park .................. H04L 25/03159

FOREIGN PATENT DOCUMENTS

| WO | 2018064306 A1 | 4/2018 |
| WO | 2019051085 | 3/2019 |
| WO | 2019095904 | 5/2019 |

OTHER PUBLICATIONS

"ETSI TS 138 214 V15.2.0", Jul. 2018, pp. 1-95 (Year: 2018).*
R1-1702088, "Further discussion on RS for phase tracking", Feb. 13-17, 2017, pp. 1-5 (Year: 2017).*
InterDigital Communications, "PT-RS performance evaluation with different time domain densities", 3GPP TSG RAN WG1 AH_NR Meeting, R1-1700857, Jan. 16-20, 2017.

* cited by examiner

FIG. 21
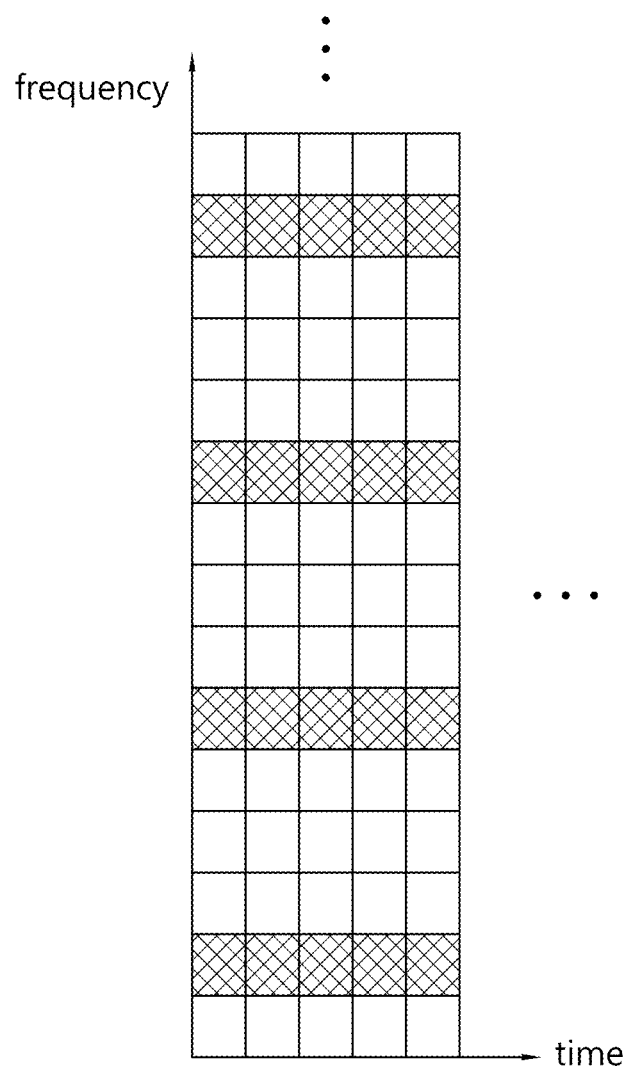
 : PTRS

METHOD OF PERFORMING PHASE NOISE COMPENSATION BY A USER EQUIPMENT (UE) AND APPARATUS USING THE SAME

This application is the National Stage filing under 35 U.S.C. 371 of International Application No. PCT/KR2020/003713 filed on Mar. 18, 2020, the contents of which is hereby incorporated by reference herein in its entirety.

BACKGROUND OF THE DISCLOSURE

Field of the Disclosure

This disclosure relates to wireless communication.

Related Art

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) in the present disclosure for convenience.

In the process of implementing wireless communication in the high-frequency region of mmWave or higher, the effect of phase noise had a great effect on reception performance, and countermeasures were suggested. However, this method is expected to show limitations in the THz band, and a corresponding appropriate method is required.

SUMMARY OF THE DISCLOSURE

A method of generating a signal for efficiently controlling phase noise in a transmission/reception operation of a physical layer of wireless communication and a reception method thereof are proposed. Specifically, the present disclosure proposes a method of estimating in the frequency domain and removing it in the time domain in order to effectively remove the phase noise characteristic in the THz band.

According to the present disclosure, it is possible to efficiently estimate and compensate for phase noise in the THz band. Specifically, through the arrangement of a phase tracking reference signal (PTRS) proposed in the present disclosure and phase noise estimation and compensation based thereon, while minimizing the implementation complexity of the receiving end, more efficient phase noise compensation in the THz band is possible.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 21 shows an example of the arrangement of PTRS that can be applied in the NR system.

DESCRIPTION OF EXEMPLARY EMBODIMENTS

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

Technical features described individually in one figure in the present specification may be individually implemented, or may be simultaneously implemented.

Figure 1:
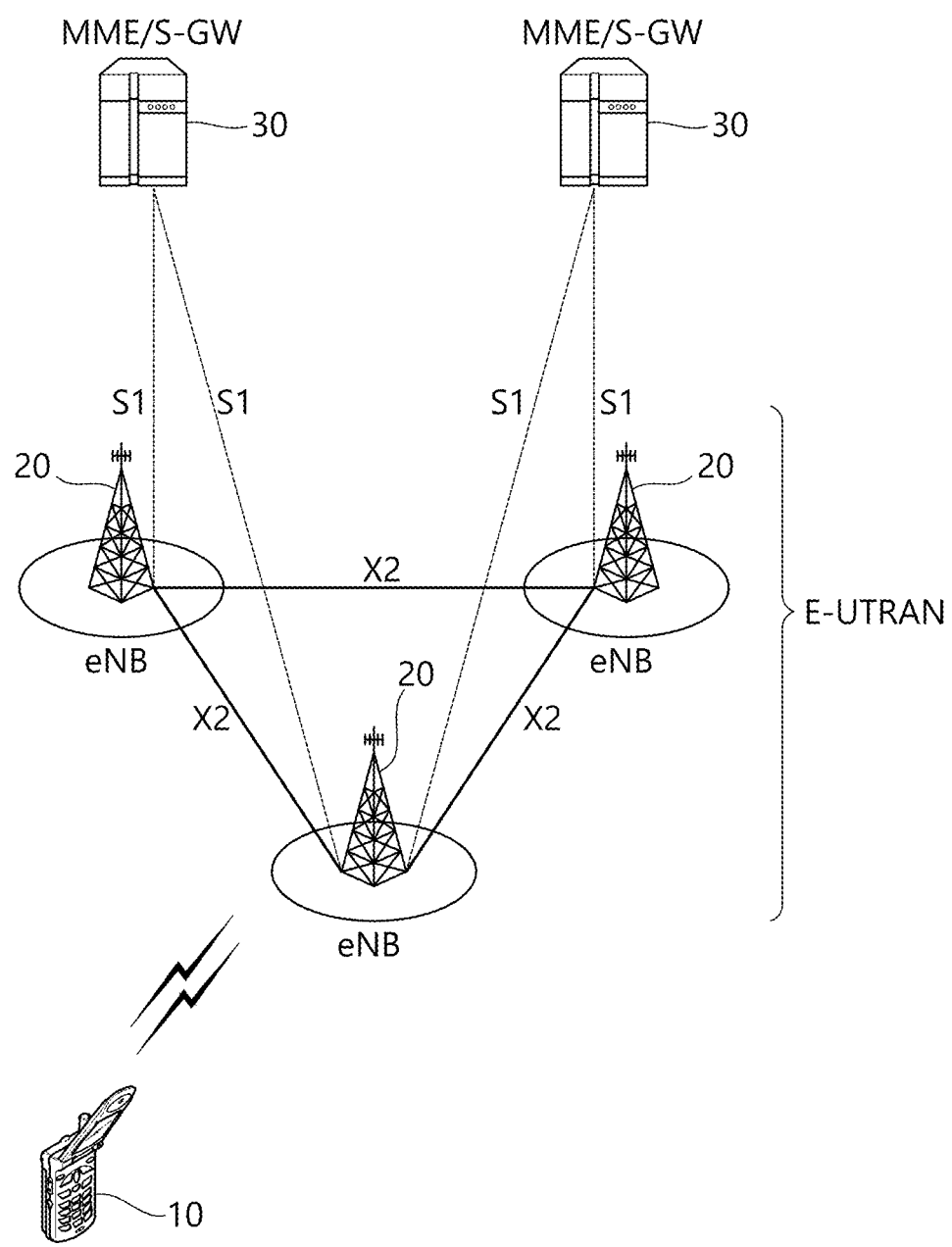
FIG. 1 shows a wireless communication system to which the present disclosure can be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
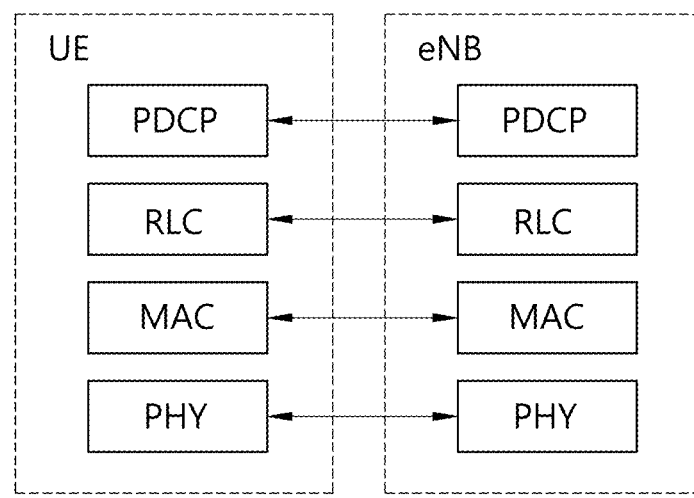
FIG. 2 is a diagram showing a wireless protocol architecture for a user plane.
Figure 3:
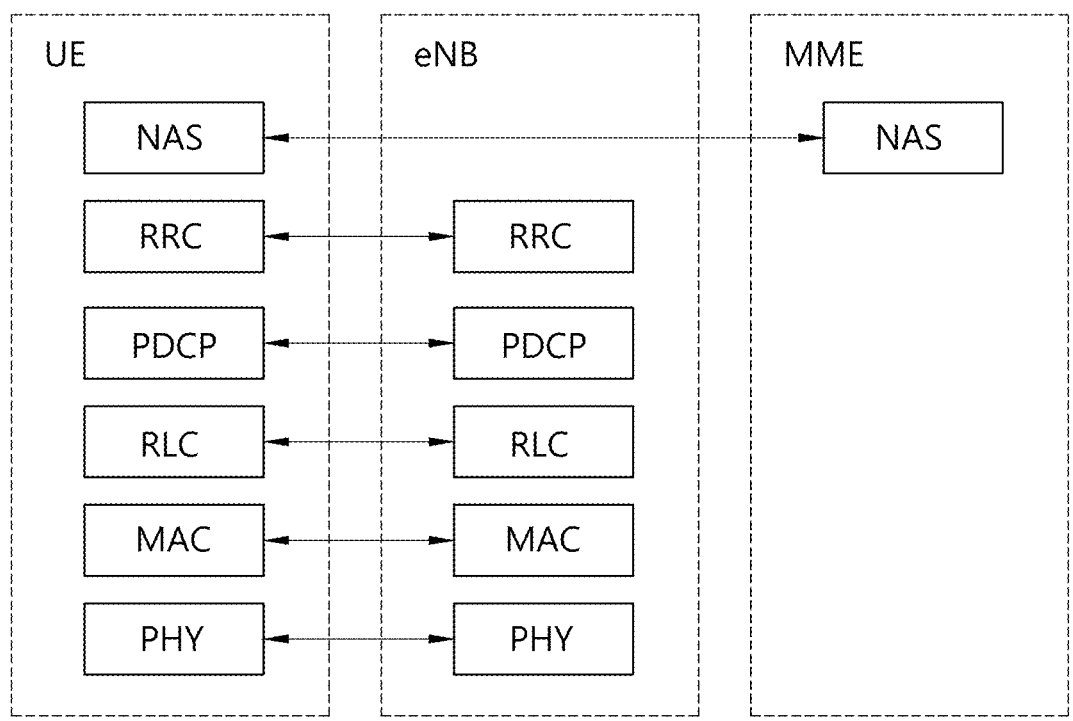
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer(=higher layer) with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time of transmission, and may be, for example, a subframe or a slot.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
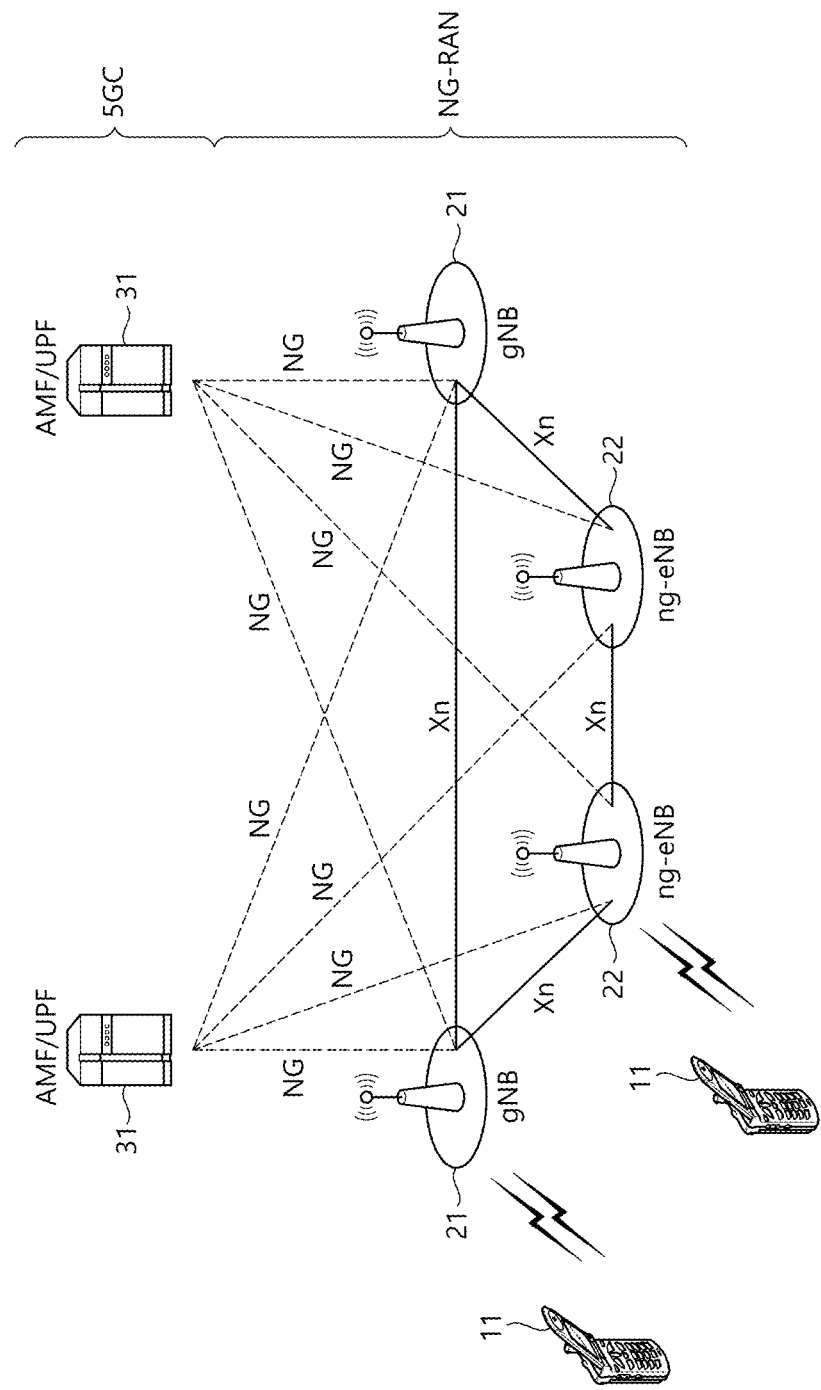
FIG. 4 shows another example of a wireless communication system to which the technical features of the present disclosure can be applied.

FIG. 4 illustrates another example of a wireless communication system to which technical features of the present disclosure are applicable.

Specifically, FIG. 4 shows system architecture based on a 5G new radio access technology (NR) system. Entities used in the 5G NR system (hereinafter, simply referred to as "NR") may absorb some or all functions of the entities (e.g., the eNB, the MME, and the S-GW) introduced in FIG. 1. The entities used in the NR system may be identified by terms with "NG" to be distinguished from LTE entities.

Referring to FIG. 4, the wireless communication system includes at least one UE 11, a next-generation RAN (NG-RAN), and a 5G core network (5GC). The NG-RAN includes at least one NG-RAN node. The NG-RAN node is an entity corresponding to the BS 20 illustrated in FIG. 5. The NG-RAN node includes at least one gNB 21 and/or at least one ng-eNB 22. The gNB 21 provides an end point of NR control-plane and user-plane protocols to the UE 11. The ng-eNB 22 provides an end point of E-UTRA user-plane and control-plane protocols to the UE 11.

The 5GC includes an access and mobility management function (AMF), a user plane function (UPF), and a session management function (SMF). The AMF hosts functions of NAS security and idle-state mobility processing. The AMF is an entity that includes the functions of a conventional MME. The UPF hosts functions of mobility anchoring function and protocol data unit (PDU) processing. The UPF is an entity that includes the functions of a conventional S-GW. The SMF hosts functions of UE IP address allocation and PDU session control.

The gNB and the ng-eNB are connected to each other via an Xn interface. The gNB and the ng-eNB are also connected to the 5GC through an NG interface. Specifically, the gNB and the ng-eNB are connected to the AMF through an NG-C interface, and to the UPF through an NG-U interface.

Figure 5:
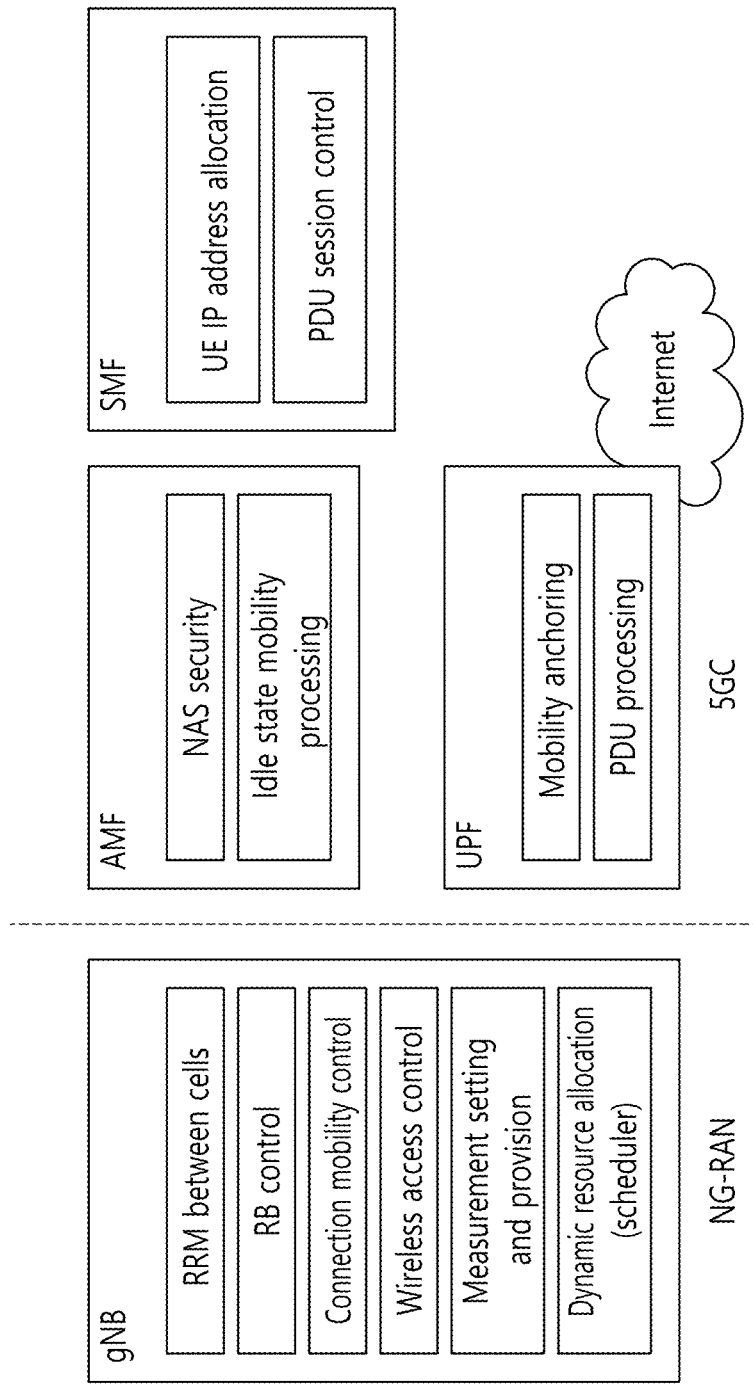
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
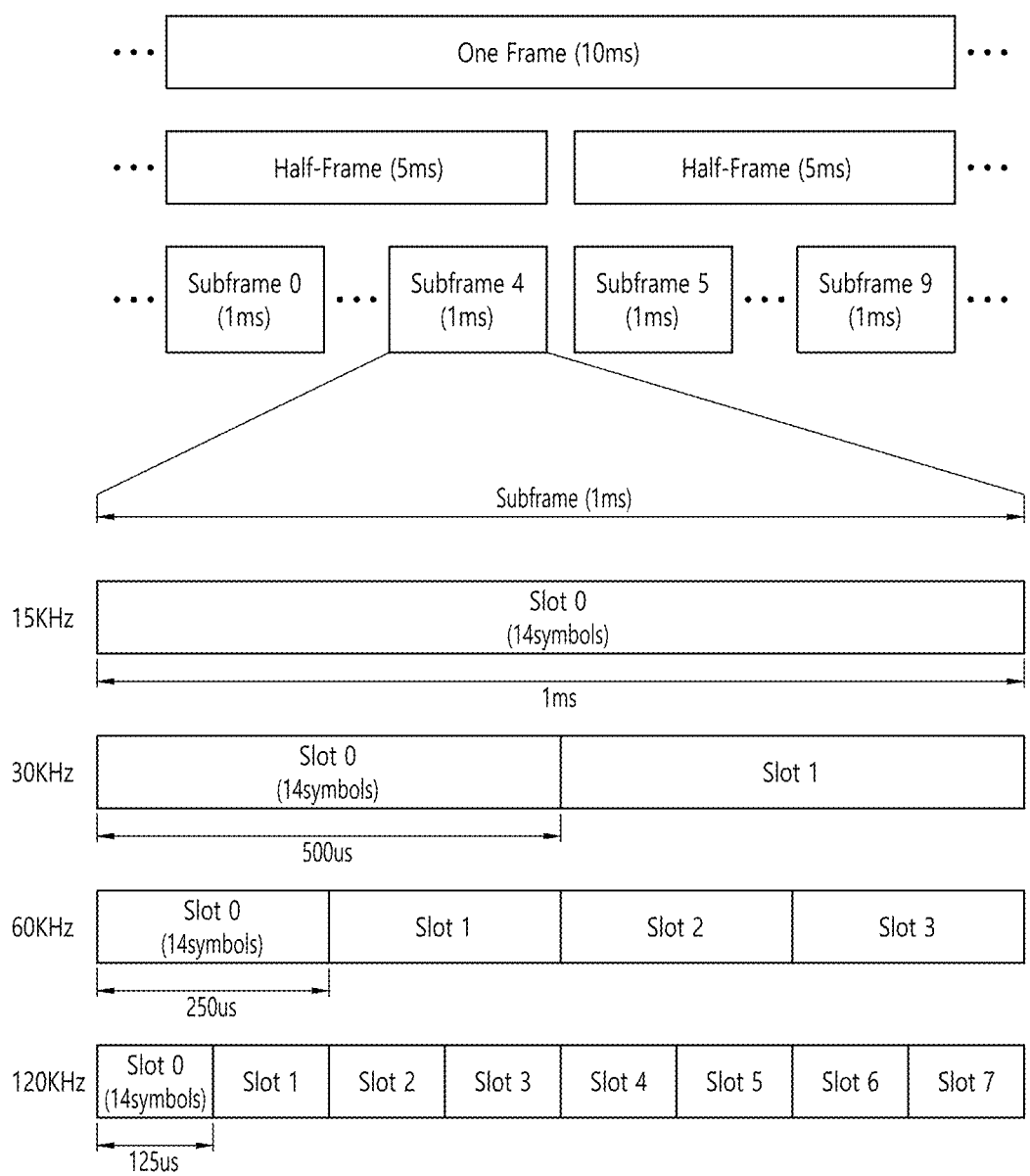
FIG. 6 illustrates an example of a frame structure that may be applied in NR.

FIG. 6 illustrates an example of a frame structure that may be applied in NR.

Referring to FIG. 6, a frame may be configured in 10 milliseconds (ms), and may include 10 subframes configured in 1 ms.

In NR, uplink and downlink transmission may be composed of frames. A radio frame has a length of 10 ms and may be defined as two 5 ms half-frames (HF). The HF may be defined as five 1 ms subframes (SFs). The SF may be divided into one or more slots, and the number of slots within the SF depends on a subcarrier spacing (SCS). Each slot includes 12 or 14 OFDM(A) symbols according to a cyclic prefix (CP). In case of using a normal CP, each slot includes 14 symbols. In case of using an extended CP, each slot includes 12 symbols. Herein, a symbol may include an OFDM symbol (or CP-OFDM symbol) and a Single Carrier- FDMA (SC-FDMA) symbol (or Discrete Fourier Transform-spread-OFDM (DFT-s-OFDM) symbol).

One or a plurality of slots may be included in the subframe according to subcarrier spacing.

The following table 1 illustrates a subcarrier spacing configuration µ.

TABLE 1

| µ | $\Delta f = 2^\mu \cdot 15[\text{kHz}]$ | Cyclic prefix |
|---|---|---|
| 0 | 15 | Normal |
| 1 | 30 | Normal |
| 2 | 60 | Normal |
|   |    | Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations µ.

TABLE 2

| µ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 3 illustrates that the number of symbols per slot, the number of slots per frame, and the number of slots per subframe vary depending on the SCS, in case of using an extended CP.

TABLE 3

| | SCS (15 · 2$^\mu$) | | |
|---|---|---|---|
| | $N^{slot}_{symb}$ | $N^{frame,u}_{slot}$ | $N^{subframe,u}_{slot}$ |
| 60 kHz (µ = 2) | 12 | 40 | 4 |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
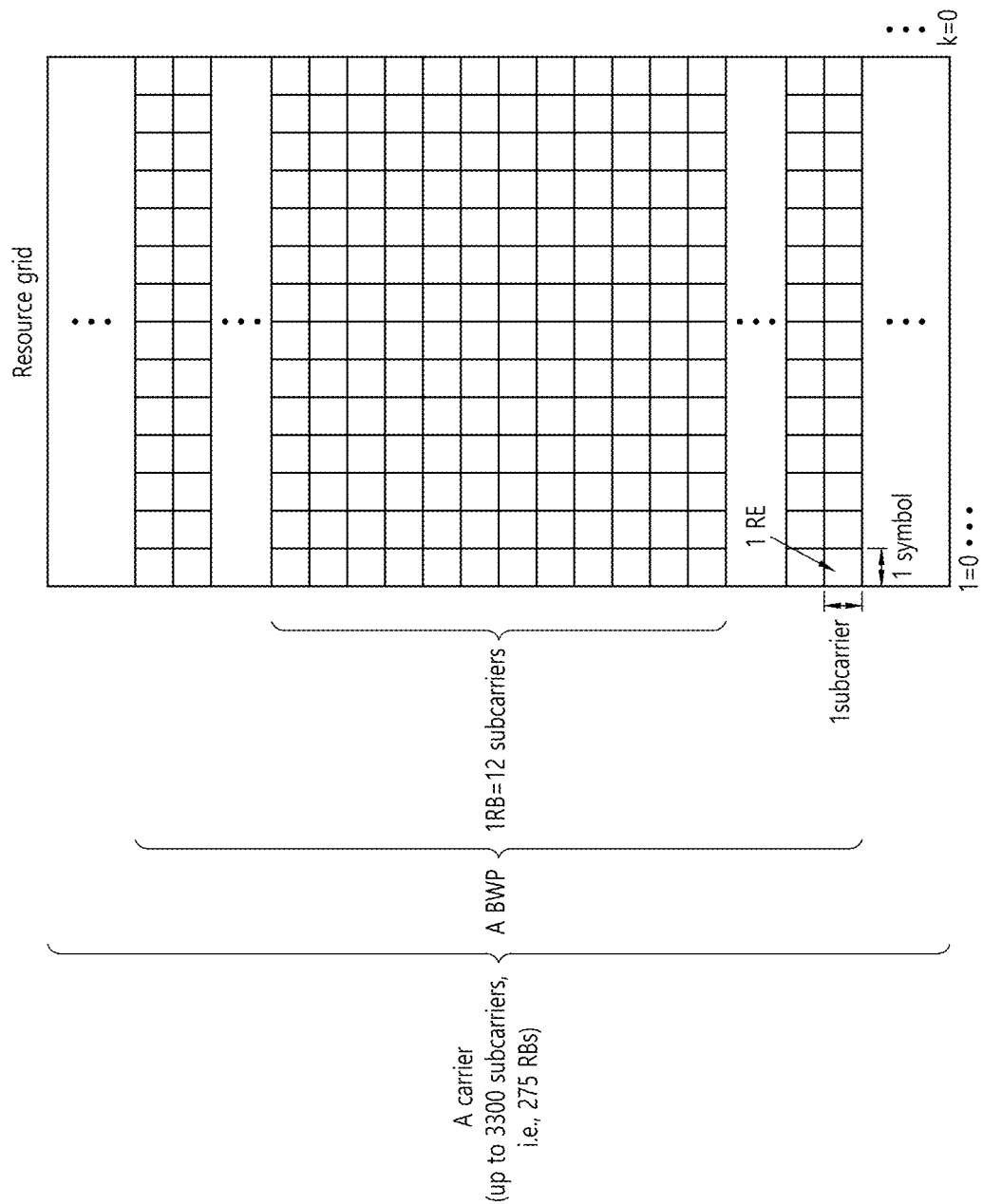
FIG. 7 illustrates a slot structure.

FIG. 7 illustrates a slot structure.

Referring to FIG. 7, a slot may include a plurality of symbols in a time domain. For example, in case of a normal CP, one slot may include 14 symbols. However, in case of an extended CP, one slot may include 12 symbols. Or, in case of a normal CP, one slot may include 7 symbols. However, in case of an extended CP, one slot may include 6 symbols.

A carrier may include a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (physical) resource blocks ((P)RBs) in the frequency domain, and the BWP may correspond to one numerology (e.g., SCS, CP length, and so on). The carrier may include up to N (e.g., 5) BWPs. Data communication may be performed via an activated BWP. In a resource grid, each element may be referred to as a resource element (RE), and one complex symbol may be mapped thereto.

A physical downlink control channel (PDCCH) may include one or more control channel elements (CCEs) as illustrated in the following table 4.

TABLE 4

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, a new unit called a control resource set (CORESET) may be introduced in the NR. The UE may receive a PDCCH in the CORESET.

Figure 8:
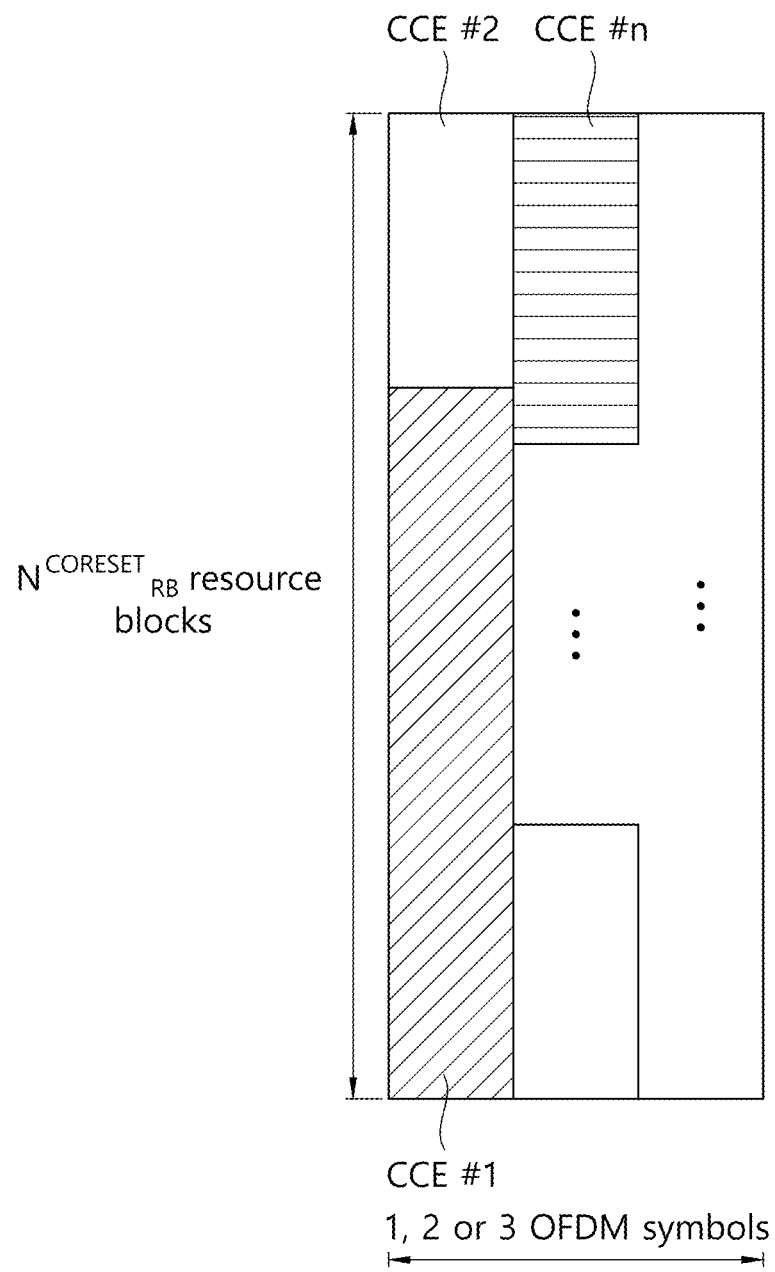
FIG. 8 illustrates CORESET.

FIG. 8 illustrates CORESET.

Referring to FIG. 8, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 8, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the UE.

Figure 9:
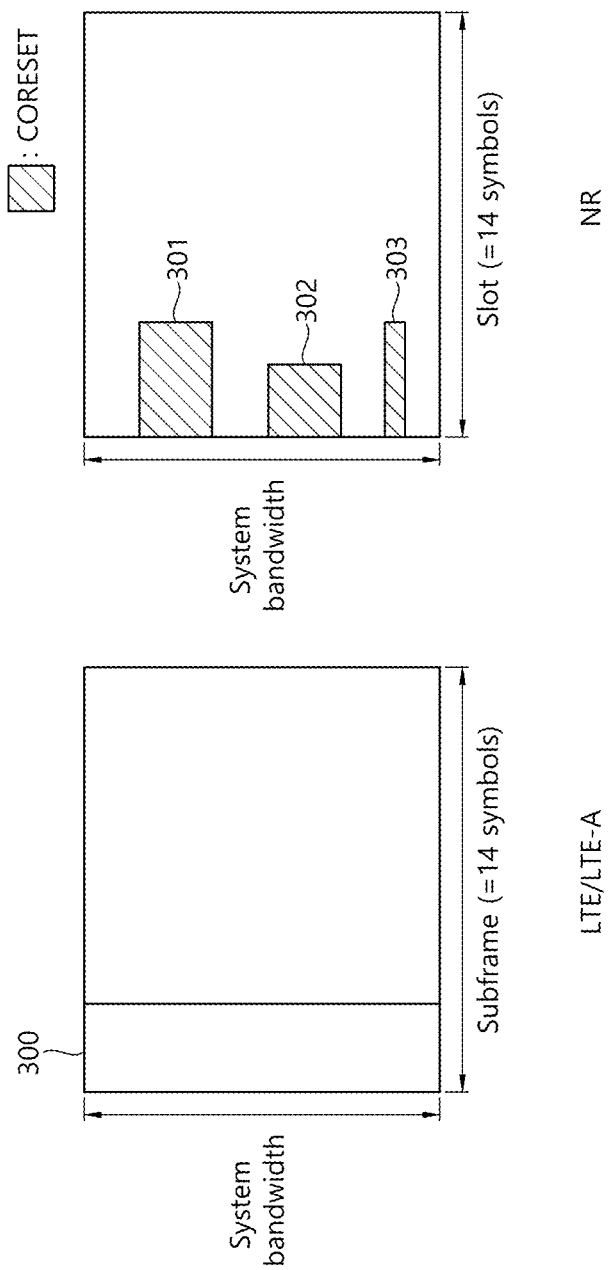
FIG. 9 is a diagram illustrating a difference between a related art control region and the CORESET in NR.

FIG. 9 is a diagram illustrating a difference between a related art control region and the CORESET in NR.

Referring to FIG. 9, a control region 300 in the related art wireless communication system (e.g., LTE/LTE-A) is configured over the entire system band used by a base station (BS). All the UEs, excluding some (e.g., eMTC/NB-IoT UE) supporting only a narrow band, shall be able to receive wireless signals of the entire system band of the BS in order to properly receive/decode control information transmitted by the BS.

On the other hand, in NR, CORESET described above was introduced. CORESETs 301, 302, and 303 are radio resources for control information to be received by the UE and may use only a portion, rather than the entirety of the system bandwidth. The BS may allocate the CORESET to each UE and may transmit control information through the allocated CORESET. For example, in FIG. 9, a first CORESET 301 may be allocated to UE 1, a second CORESET 302 may be allocated to UE 2, and a third CORESET 303 may be allocated to UE 3. In the NR, the UE may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

Meanwhile, in NR, the following technologies/features can be applied.

<Self-Contained Subframe Structure>

Figure 10:
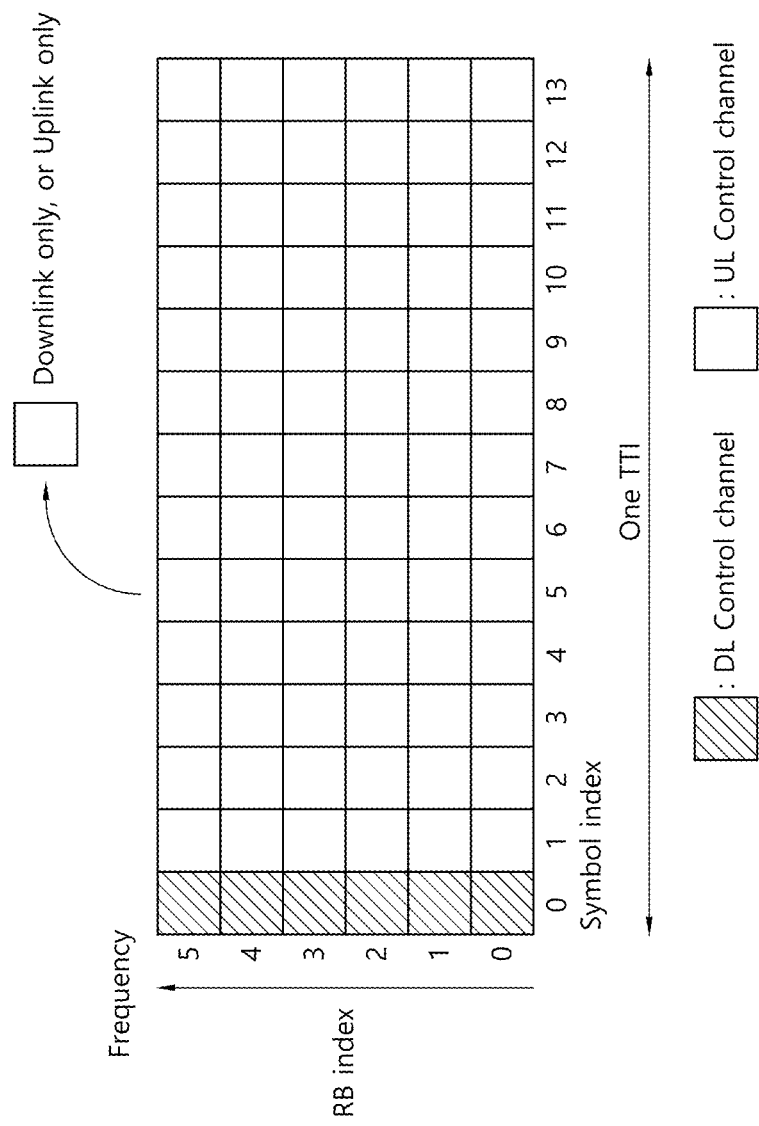
FIG. 10 illustrates an example of a frame structure for new radio access technology.

FIG. 10 illustrates an example of a frame structure for new radio access technology.

In NR, a structure in which a control channel and a data channel are time-division-multiplexed within one TTI, as shown in FIG. 10, can be considered as a frame structure in order to minimize latency.

In FIG. 10, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a UE to switch from a transmission mode to a reception mode or from the reception mode to the transmission mode may be required. To this end, some OFDM symbols at a time when DL switches to UL may be set to a guard period (GP) in the self-contained subframe structure.

Figure 11:
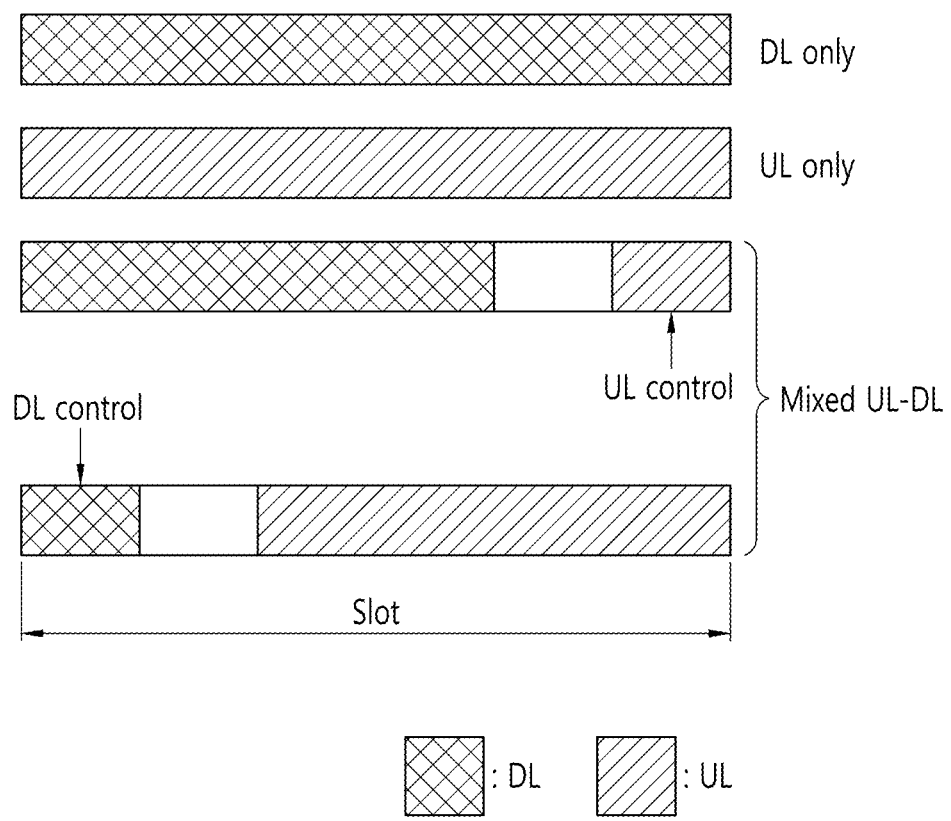
FIG. 11 illustrates a structure of a self-contained slot.

FIG. 11 illustrates a structure of a self-contained slot.

Referring to FIG. 11, one slot may have a self-contained structure in which all of a DL control channel, DL or UL data, and a UL control channel may be included. For example, first N symbols (hereinafter, DL control region) in the slot may be used to transmit a DL control channel, and last M symbols (hereinafter, UL control region) in the slot may be used to transmit a UL control channel. N and M are integers greater than or equal to 0. A resource region (hereinafter, a data region) which exists between the DL control region and the UL control region may be used for DL data transmission or UL data transmission. For example, the following configuration may be considered. Respective durations are listed in a temporal order.

1. DL only configuration
2. UL only configuration
3. Mixed UL-DL configuration
   DL region+Guard period (GP)+UL control region
   DL control region+GP+UL region Here, the DL region may be (i) DL data region, (ii) DL control region+DL data region. The UL region may be (i) UL data region, (ii) UL data region+UL control region A PDCCH may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. A GP provides a time gap in a process in which a BS and a UE switch from a TX mode to an RX mode or a process in which the BS and the UE switch from the RX mode to the TX mode. Some symbols at the time of switching from DL to UL within a subframe may be configured as the GP.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 12:
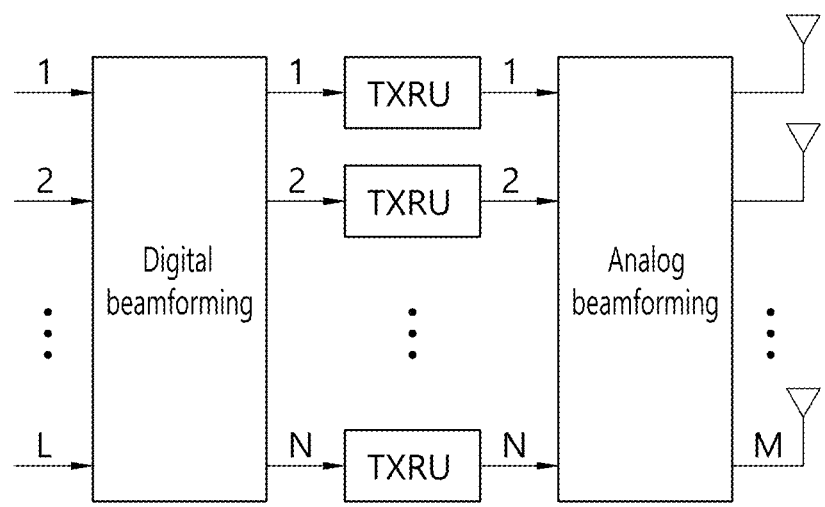
FIG. 12 is an abstract schematic diagram of a hybrid beamforming structure in terms of a TXRU and a physical antenna.

FIG. 12 is an abstract diagram of a hybrid beamforming structure from the viewpoint of the TXRU and the physical antenna.

In FIG. 12, the number of digital beams is L, and the number of analog beams is N. Furthermore, in the NR system, a direction of supporting more efficient beamforming to a UE located in a specific area is considered by designing the base station to change analog beamforming in units of symbols. Further, when defining N specific TXRUs and M RF antennas as one antenna panel in FIG. 12, in the NR system, a method of introducing a plurality of antenna panels to which hybrid beamforming independent of each other can be applied is being considered.

As described above, when the base station uses a plurality of analog beams, since analog beams advantageous for signal reception may be different for each UE, a beam sweeping operation, in which at least for a synchronization signal, system information, paging, etc., a plurality of analog beams to be applied by the base station in a specific subframe are changed for each symbol, that allows all UEs to have a reception occasion is being considered.

Figure 13:
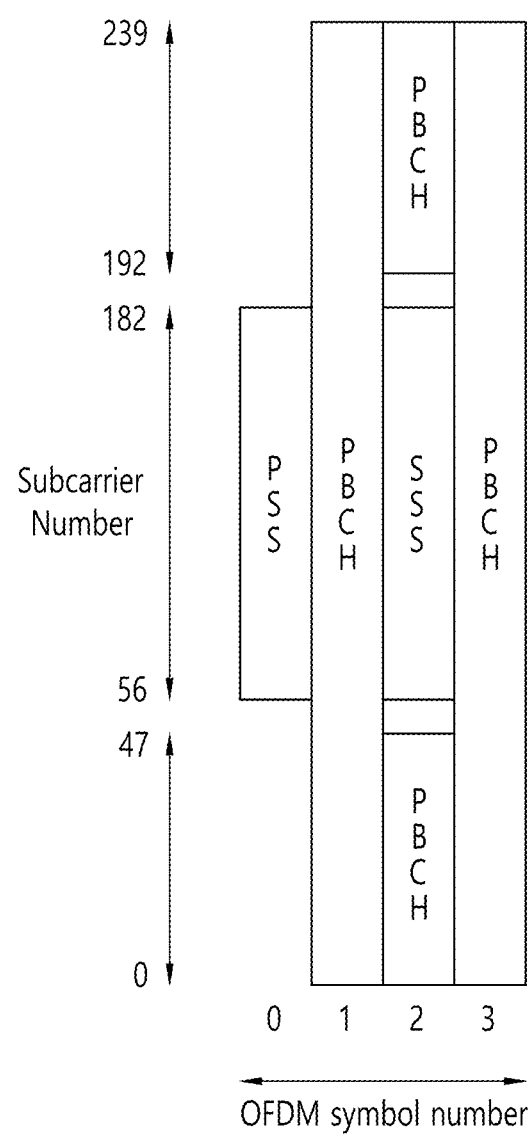
FIG. 13 shows a synchronization signal and a PBCH (SS/PBCH) block.

FIG. 13 shows a synchronization signal and a PBCH (SS/PBCH) block.

Referring to FIG. 13, an SS/PBCH block may include a PSS and an SSS, each of which occupies one symbol and 127 subcarriers, and a PBCH, which spans three OFDM symbols and 240 subcarriers where one symbol may include an unoccupied portion in the middle reserved for the SSS. The periodicity of the SS/PBCH block may be configured by a network, and a time position for transmitting the SS/PBCH block may be determined on the basis of subcarrier spacing.

Polar coding may be used for the PBCH. A UE may assume band-specific subcarrier spacing for the SS/PBCH block as long as a network does not configure the UE to assume different subcarrier spacings.

The PBCH symbols carry frequency-multiplexed DMRS thereof. QPSK may be used for the PBCH. 1008 unique physical-layer cell IDs may be assigned.

For a half frame with SS/PBCH blocks, first symbol indices for candidate SS/PBCH blocks are determined according to subcarrier spacing of SS/PBCH blocks, which will be described later.

Case A—Subcarrier spacing 15 kHz: The first symbols of the candidate SS/PBCH blocks have an index of {2, 8}+14*n. For carrier frequencies less than or equal to 3 GHz, n=0, 1. For carrier frequencies greater than 3 GHz and less than or equal to 6 GHz, n=0, 1, 2, 3.

Case B—Subcarrier spacing 30 kHz: The first symbols of the candidate SS/PBCH blocks have an index of {4, 8, 16, 20}+28*n. For carrier frequencies less than or equal to 3 GHz, n=0. For carrier frequencies greater than 3 GHz and less than or equal to 6 GHz, n=0, 1.

Case C—Subcarrier spacing 30 kHz: The first symbols of candidate SS/PBCH blocks have an index of {2, 8}+14*n. For carrier frequencies less than or equal to 3 GHz, n=0, 1. For carrier frequencies greater than 3 GHz and less than or equal to 6 GHz, n=0, 1, 2, 3.

Case D—Subcarrier spacing 120 kHz: The first symbols of the candidate SS/PBCH blocks have an index of {4, 8, 16, 20}+28*n. For carrier frequencies greater than 6 GHz, n=0, 1, 2, 3, 5, 6, 7, 8, 10, 11, 12, 13, 15, 16, 17, 18.

Case E—Subcarrier spacing 240 kHz: The first symbols of the candidate SS/PBCH blocks have an index of {8, 12, 16, 20, 32, 36, 40, 44}+56*n. For carrier frequencies greater than 6 GHz, n=0, 1, 2, 3, 5, 6, 7, 8.

Candidate SS/PBCH blocks in a half frame are indexed in ascending order from 0 to L−1 on the time axis. The UE shall determine 2 LSB bits for L=4 and 3 LSB bits for L>4 of the SS/PBCH block index per half frame from one-to-one mapping with the index of the DMRS sequence transmitted in the PBCH. For L=64, the UE shall determine 3 MSB bits of the SS/PBCH block index per half frame by the PBCH payload bits.

By the higher layer parameter 'SSB-transmitted-SIB1', the index of SS/PBCH blocks in which the UE cannot receive other signals or channels in REs overlapping with REs corresponding to SS/PBCH blocks can be set. In addition, according to the higher layer parameter 'SSB-transmitted', the index of SS/PBCH blocks per serving cell in which the UE cannot receive other signals or channels in REs overlapping with REs corresponding to the SS/PBCH blocks can be set. The setting by 'SSB-transmitted' may take precedence over the setting by 'SSB-transmitted-SIB1'. A periodicity of a half frame for reception of SS/PBCH blocks per serving cell may be set by a higher layer parameter 'SSB-periodicityServingCell'. If the UE does not set the periodicity of the half frame for the reception of SS/PBCH blocks, the UE shall assume the periodicity of the half frame. The UE may assume that the periodicity is the same for all SS/PBCH blocks in the serving cell.

Figure 14:
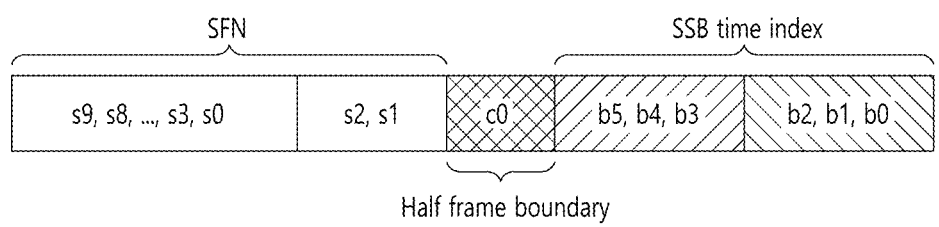
FIG. 14 is for explaining a method for a UE to obtain timing information.

FIG. 14 is for explaining a method for a UE to obtain timing information.

First, the UE may obtain 6-bit SFN information through the MIB (Master Information Block) received in the PBCH. In addition, SFN 4 bits can be obtained in the PBCH transport block.

Second, the UE may obtain a 1-bit half frame indicator as part of the PBCH payload. In less than 3 GHz, the half frame indicator may be implicitly signaled as part of the PBCH DMRS for Lmax=4.

Finally, the UE may obtain the SS/PBCH block index by the DMRS sequence and the PBCH payload. That is, LSB 3 bits of the SS block index can be obtained by the DMRS sequence for a period of 5 ms. Also, the MSB 3 bits of the timing information are explicitly carried within the PBCH payload (for >6 GHz).

In initial cell selection, the UE may assume that a half frame with SS/PBCH blocks occurs with a periodicity of 2 frames. Upon detecting the SS/PBCH block, the UE determines that a control resource set for the Type0-PDCCH common search space exists if $k_{SSB} \leq 23$ for FR1 and $k_{SSB} \leq 11$ for FR2. The UE determines that there is no control resource set for the Type0-PDCCH common search space if $k_{SSB} > 23$ for FR1 and $k_{SSB} > 11$ for FR2.

For a serving cell without transmission of SS/PBCH blocks, the UE acquires time and frequency synchronization of the serving cell based on reception of the SS/PBCH blocks on the PSCell or the primary cell of the cell group for the serving cell.

Hereinafter, system information acquisition will be described.

System information (SI) is divided into a master information block (MIB) and a plurality of system information blocks (SIBs) where:

the MIB is transmitted always on a BCH according to a period of 40 ms, is repeated within 80 ms, and includes parameters necessary to obtain system information block type1 (SIB1) from a cell;

SIB1 is periodically and repeatedly transmitted on a DL-SCH. SIB1 includes information on availability and scheduling (e.g., periodicity or SI window size) of other SIBs. Further, SIB1 indicates whether the SIBs (i.e., the other SIBs) are periodically broadcast or are provided by request. When the other SIBs are provided by request, SIB1 includes information for a UE to request SI;

SIBs other than SIB1 are carried via system information (SI) messages transmitted on the DL-SCH. Each SI message is transmitted within a time-domain window (referred to as an SI window) periodically occurring;

For a PSCell and SCells, an RAN provides required SI by dedicated signaling. Nevertheless, a UE needs to acquire an MIB of the PSCell in order to obtain the SFN timing of a SCH (which may be different from an MCG). When relevant SI for a SCell is changed, the RAN releases and adds the related SCell. For the PSCell, SI can be changed only by reconfiguration with synchronization (sync).

Figure 15:
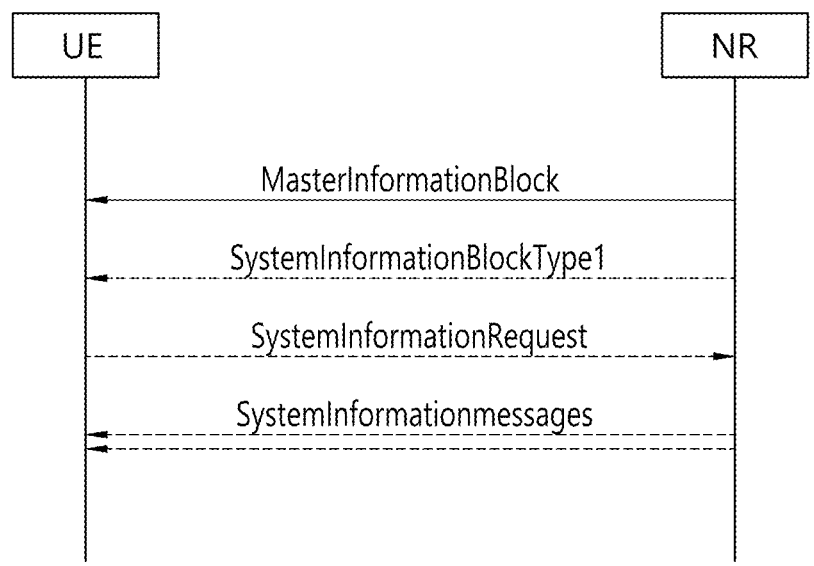
FIG. 15 shows an example of a process of acquiring system information of a UE.

FIG. 15 shows an example of a process of acquiring system information of a UE.

According to FIG. 15, the UE may receive the MIB from the network and then receive the SIB1. Thereafter, the UE may transmit a system information request to the network, and may receive a 'SystemInformation message' from the network in response thereto.

The UE may apply a system information acquisition procedure for acquiring AS (access stratum) and NAS (non-access stratum) information.

UEs in RRC_IDLE and RRC_INACTIVE states shall ensure (at least) valid versions of MIB, SIB1 and SystemInformationBlockTypeX (according to the relevant RAT support for UE-controlled mobility).

The UE in RRC_CONNECTED state shall guarantee valid versions of MIB, SIB1, and SystemInformationBlockTypeX (according to mobility support for the related RAT).

The UE shall store the related SI obtained from the currently camped/serving cell. The SI version obtained and stored by the UE is valid only for a certain period of time. The UE may use this stored version of the SI after, for example, cell reselection, return from out of coverage, or system information change indication.

Hereinafter, random access will be described.

The random access procedure of the UE can be summarized as in the following table 5.

TABLE 5

| | Type of signal | Action/Acquired Information |
|---|---|---|
| Step 1 | Uplink PRACH preamble | Initial beam acquisition Random Election of RA-Preamble ID |
| Step 2 | Random access response on DL-SCH | Timing arrangement information RA-preamble ID Initial uplink grant, temporary C-RNTI |
| Step 3 | Uplink transmission on UL-SCH | RRC connection request UE identifier |
| Step 4 | Contention resolution of downlink | C-RNTI on PDCCH for initial access C-RNTI on PDCCH for UE in RRC_CONNECTED state |

Figure 16:
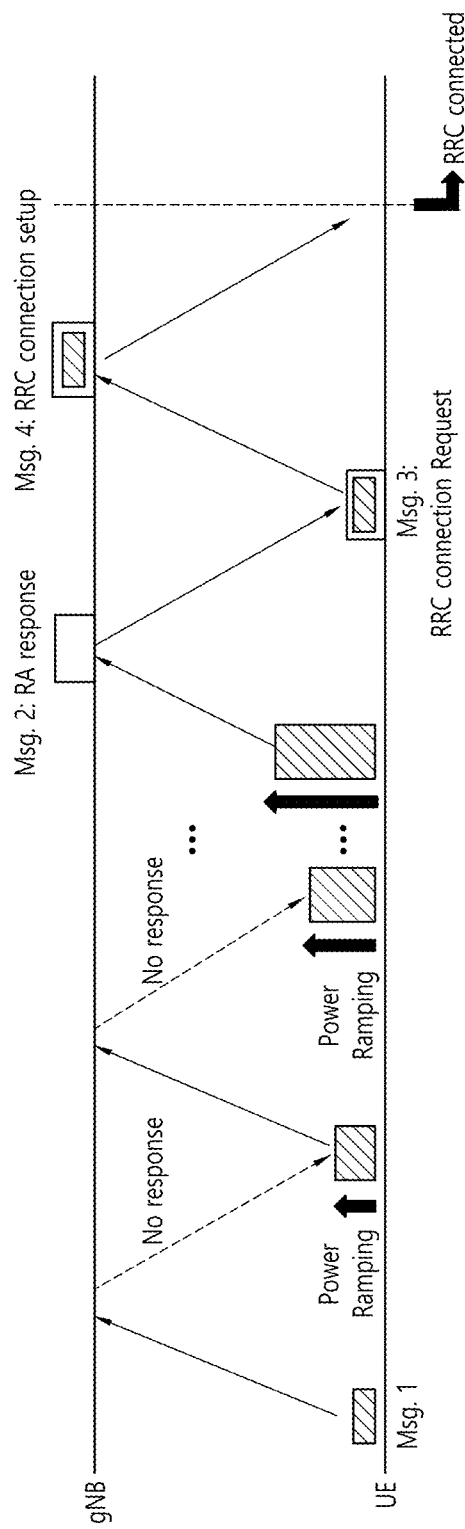
FIG. 16 is for explaining a random access procedure.

FIG. 16 is for explaining a random access procedure.

Referring to FIG. 16, first, the UE may transmit a physical random access channel (PRACH) preamble in uplink as message (Msg) 1 of the random access procedure.

Random access preamble sequences having two different lengths are supported. A long sequence of length 839 applies to subcarrier spacings of 1.25 kHz and 5 kHz, and a short sequence of length 139 applies to subcarrier spacings of 15, 30, 60, and 120 kHz. A long sequence supports an unrestricted set and a limited set of types A and B, whereas a short sequence supports only an unrestricted set.

A plurality of RACH preamble formats are defined with one or more RACH OFDM symbols, a different cyclic prefix (CP), and a guard time. The PRACH preamble configuration to be used is provided to the UE as system information.

If there is no response to Msg1, the UE may retransmit the power-rammed PRACH preamble within a prescribed number of times. The UE calculates the PRACH transmission power for retransmission of the preamble based on the most recent estimated path loss and power ramping counter. If the UE performs beam switching, the power ramping counter does not change.

Figure 17:
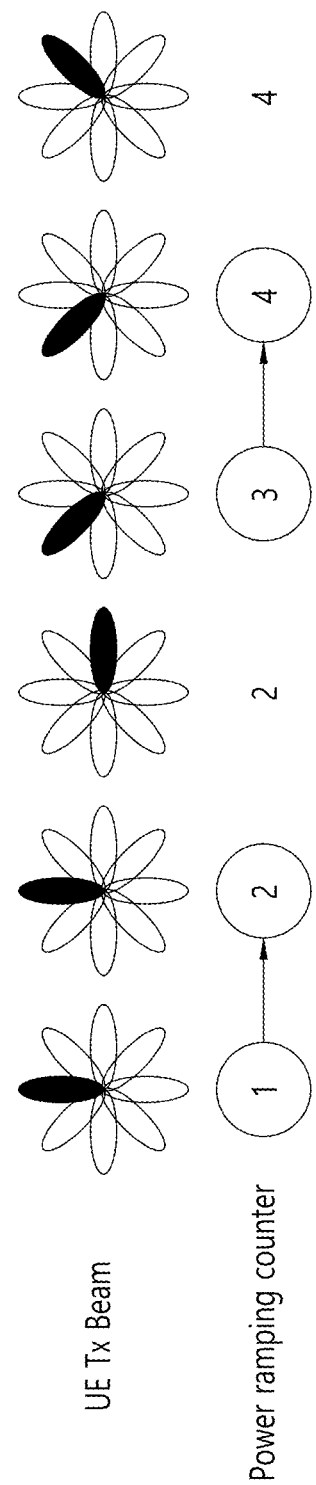
FIG. 17 is a diagram for describing a power ramping counter.

FIG. 17 is a diagram for describing a power ramping counter.

The UE may perform power ramping for retransmission of the random access preamble based on the power ramping counter. Here, as described above, the power ramping counter does not change when the UE performs beam switching during PRACH retransmission.

Referring to FIG. 17, when the UE retransmits the random access preamble for the same beam, the UE increments the power ramping counter by 1 as the power ramping counter increases from 1 to 2 and from 3 to 4. However, when the beam is changed, the power ramping counter does not change during PRACH retransmission.

Figure 18:
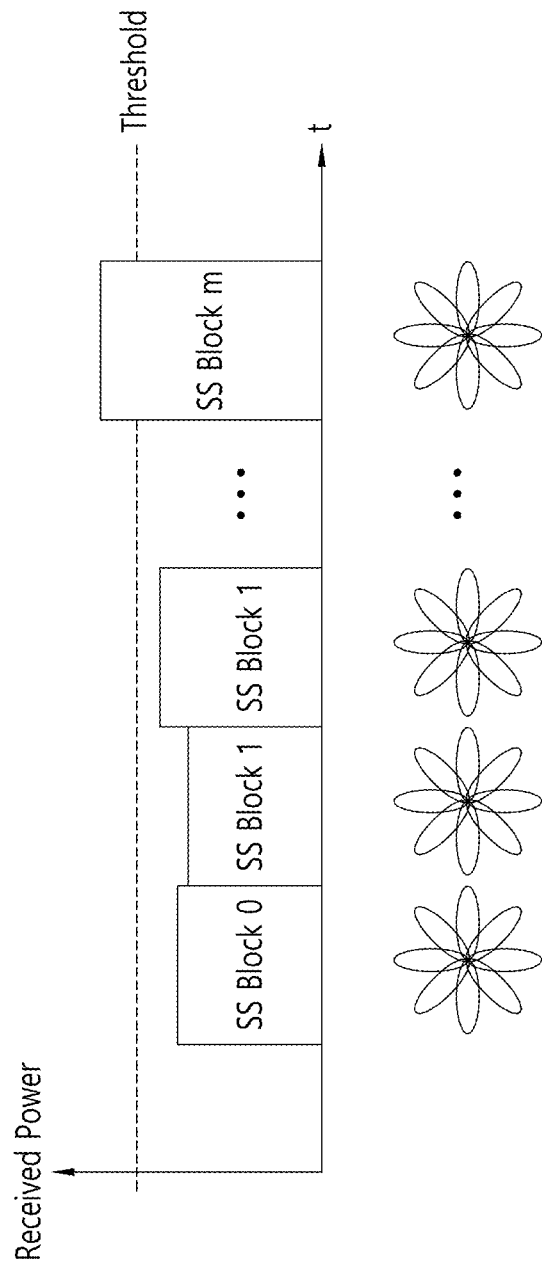
FIG. 18 is for explaining the concept of the threshold value of the SS block for the RACH resource relationship.

FIG. 18 is for explaining the concept of the threshold value of the SS block for the RACH resource relationship.

The system information informs the UE of the relationship between SS blocks and RACH resources. The threshold of the SS block for the RACH resource relationship is based on RSRP and network configuration. Transmission or retransmission of the RACH preamble is based on an SS block that satisfies a threshold. Accordingly, in the example of FIG. 18, since the SS block m exceeds the threshold of the received power, the RACH preamble is transmitted or retransmitted based on the SS block m.

Thereafter, when the UE receives a random access response on the DL-SCH, the DL-SCH may provide timing arrangement information, an RA-preamble ID, an initial uplink grant, and a temporary C-RNTI.

Based on the information, the UE may perform uplink transmission on the UL-SCH as Msg3 of the random access procedure. Msg3 may include the RRC connection request and UE identifier.

In response, the network may transmit Msg4, which may be treated as a contention resolution message, in downlink. By receiving this, the UE can enter the RRC connected state.

<Bandwidth Part (BWP)>

In the NR system, a maximum of 400 MHz can be supported per component carrier (CC). If a UE operating in such a wideband CC operates with RF for all CCs turn on all the time, UE battery consumption may increase. Or, considering use cases operating in one wideband CC (e.g., eMBB, URLLC, mMTC, etc.), different numerologies (e.g., subcarrier spacings (SCSs)) can be supported for different frequency bands in the CC. Or, UEs may have different capabilities for a maximum bandwidth. In consideration of this, an eNB may instruct a UE to operate only in a part of the entire bandwidth of a wideband CC, and the part of the bandwidth is defined as a bandwidth part (BWP) for convenience. A BWP can be composed of resource blocks (RBs) consecutive on the frequency axis and can correspond to one numerology (e.g., a subcarrier spacing, a cyclic prefix (CP) length, a slot/mini-slot duration, or the like).

Meanwhile, the eNB can configure a plurality of BWPs for a UE even within one CC. For example, a BWP occupying a relatively small frequency region can be set in a PDCCH monitoring slot and a PDSCH indicated by a PDCCH can be scheduled on a BWP wider than the BWP. When UEs converge on a specific BWP, some UEs may be set to other BWPs for load balancing. Otherwise, BWPs on both sides of a bandwidth other than some spectra at the center of the bandwidth may be configured in the same slot in consideration of frequency domain inter-cell interference cancellation between neighbor cells. That is, the eNB can configure at least one DL/UL BWP for a UE associated with(=related with) a wideband CC and activate at least one of DL/UL BWPs configured at a specific time (through L1 signaling or MAC CE or RRC signaling), and switching to other configured DL/UL BWPs may be indicated (through L1 signaling or MAC CE or RRC signaling) or switching to a determined DL/UL BWP may occur when a timer value expires on the basis of a timer. Here, an activated DL/UL BWP is defined as an active DL/UL BWP. However, a UE may not receive a configuration for a DL/UL BWP when the UE is in an initial access procedure or RRC connection is not set up. In such a situation, a DL/UL BWP assumed by the UE is defined as an initial active DL/UL BWP.

<DRX (Discontinuous Reception)>

Discontinuous Reception (DRX) refers to an operation mode in which a UE (User Equipment) reduces battery consumption so that the UE can discontinuously receive a downlink channel That is, the UE configured for DRX can reduce power consumption by discontinuously receiving the DL signal.

The DRX operation is performed within a DRX cycle indicating a time interval in which On Duration is periodically repeated. The DRX cycle includes an on-duration and a sleep duration (or a DRX opportunity). The on-duration indicates a time interval during which the UE monitors the PDCCH to receive the PDCCH.

DRX may be performed in RRC (Radio Resource Control)_IDLE state (or mode), RRC_INACTIVE state (or mode), or RRC_CONNECTED state (or mode). In RRC_IDLE state and RRC_INACTIVE state, DRX may be used to receive paging signal discontinuously.

RRC_IDLE state: a state in which a radio connection (RRC connection) is not established between the base station and the UE.

RRC_INACTIVE state: A wireless connection (RRC connection) is established between the base station and the UE, but the wireless connection is inactive.

RRC_CONNECTED state: a state in which a radio connection (RRC connection) is established between the base station and the UE.

DRX can be basically divided into idle mode DRX, connected DRX (C-DRX), and extended DRX.

DRX applied in the IDLE state may be named idle mode DRX, and DRX applied in the CONNECTED state may be named connected mode DRX (C-DRX).

Extended/Enhanced DRX (eDRX) is a mechanism that can extend the cycles of idle mode DRX and C-DRX, and Extended/Enhanced DRX (eDRX) can be mainly used for (massive) IoT applications. In idle mode DRX, whether to allow eDRX may be configured based on system information (e.g., SIB1). SIB1 may include an eDRX-allowed parameter. The eDRX-allowed parameter is a parameter indicating whether idle mode extended DRX is allowed.

<Idle Mode DRX>

In the idle mode, the UE may use DRX to reduce power consumption. One paging occasion (paging occasion; PO) is a subframe in which P-RNTI (Paging-Radio Network Temporary Identifier) can be transmitted through PDCCH (Physical Downlink Control Channel), MPDCCH (MTC PDCCH), or NPDCCH (a narrowband PDCCH) (which addresses the paging message for NB-IoT).

In P-RNTI transmitted through MPDCCH, PO may indicate a start subframe of MPDCCH repetition. In the case of the P-RNTI transmitted through the NPDCCH, when the subframe determined by the PO is not a valid NB-IoT downlink subframe, the PO may indicate the start subframe of the NPDCCH repetition. Therefore, the first valid NB-IoT downlink subframe after PO is the start subframe of NPDCCH repetition.

One paging frame (PF) is one radio frame that may include one or a plurality of paging occasions. When DRX is used, the UE only needs to monitor one PO per DRX cycle. One paging narrow band (PNB) is one narrow band in which the UE performs paging message reception. PF, PO, and PNB may be determined based on DRX parameters provided in system information.

Figure 19:
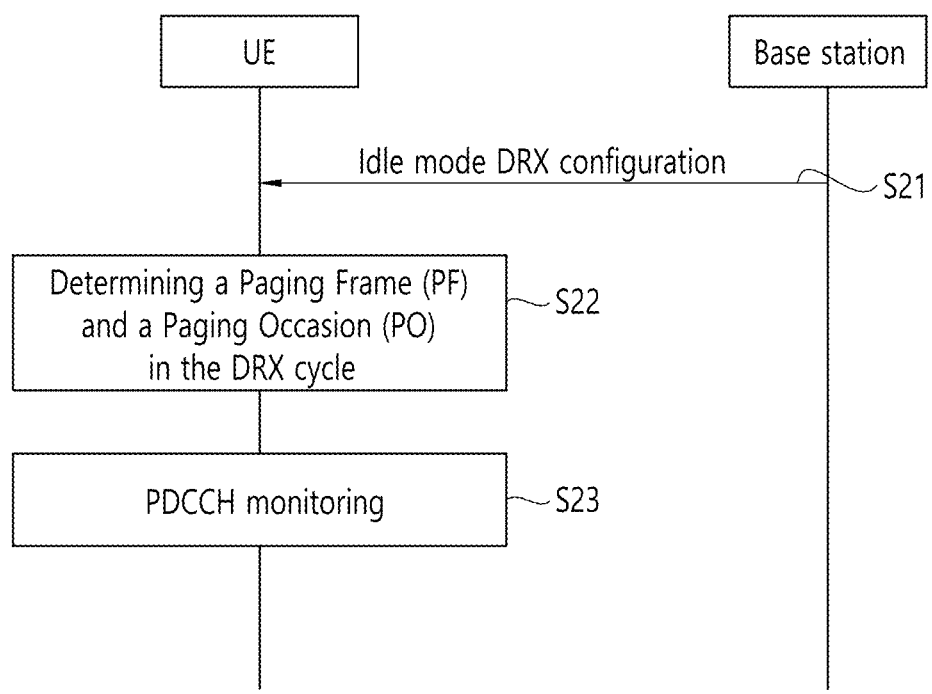
FIG. 19 is a flowchart illustrating an example of performing an idle mode DRX operation.

FIG. 19 is a flowchart illustrating an example of performing an idle mode DRX operation.

According to FIG. 19, the UE may receive idle mode DRX configuration information from the base station through higher layer signaling (e.g., system information) (S21).

The UE may determine a Paging Frame (PF) and a Paging Occasion (PO) to monitor the PDCCH in the paging DRX cycle based on the idle mode DRX configuration information (S22). In this case, the DRX cycle may include an on-duration and a sleep duration (or an opportunity of DRX).

The UE may monitor the PDCCH in the PO of the determined PF (S23). Here, for example, the UE monitors only one subframe (PO) per paging DRX cycle. In addition, when the UE receives the PDCCH scrambled by the P-RNTI during the on-duration (i.e., when paging is detected), the UE may transition to the connected mode and may transmit/receive data to/from the base station.

<Connected Mode DRX(C-DRX)>

C-DRX means DRX applied in the RRC connection state. The DRX cycle of C-DRX may consist of a short DRX cycle and/or a long DRX cycle. Here, a short DRX cycle may correspond to an option.

When C-DRX is configured, the UE may perform PDCCH monitoring for the on-duration. If the PDCCH is successfully detected during PDCCH monitoring, the UE may operate (or run) an inactive timer and maintain an awake state. Conversely, if the PDCCH is not successfully detected during PDCCH monitoring, the UE may enter the sleep state after the on-duration ends.

When C-DRX is configured, a PDCCH reception occasion (e.g., a slot having a PDCCH search space) may be configured non-contiguously based on the C-DRX configuration. In contrast, if C-DRX is not configured, a PDCCH reception occasion (e.g., a slot having a PDCCH search space) may be continuously configured in the present disclosure.

On the other hand, PDCCH monitoring may be limited to a time interval set as a measurement gap (gap) regardless of the C-DRX configuration.

Figure 20:
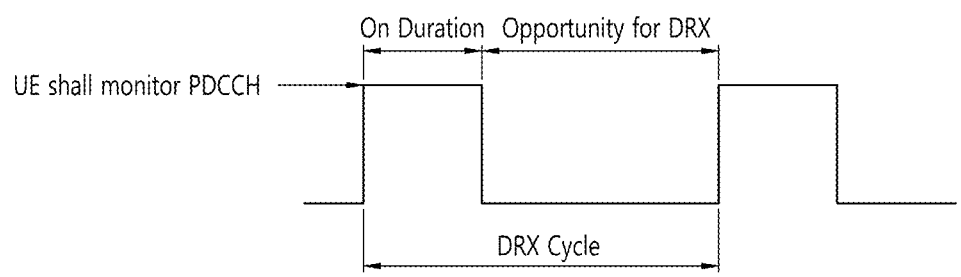
FIG. 20 illustrates a DRX cycle.

FIG. 20 illustrates a DRX cycle.

Referring to FIG. 20, a DRX cycle includes "On Duration" and "Opportunity for DRX". The DRX cycle defines a time interval in which "On Duration" is periodically repeated. "On Duration" represents a time period that the UE monitors to receive the PDCCH. When DRX is configured, the UE performs PDCCH monitoring during "On Duration". If there is a PDCCH successfully detected during PDCCH monitoring, the UE operates an inactivity timer and maintains an awake state. Meanwhile, if there is no PDCCH successfully detected during PDCCH monitoring, the UE enters a sleep state after the "On Duration" is over. Accordingly, when DRX is configured, PDCCH monitoring/reception may be discontinuously performed in the time domain in performing the procedures and/or methods described/suggested above. For example, when DRX is configured, in the present disclosure, a PDCCH reception occasion (e.g., a slot having a PDCCH search space) may be set discontinuously according to the DRX configuration. Meanwhile, when DRX is not configured, PDCCH monitoring/reception may be continuously performed in the time domain in performing the procedure and/or method described/proposed above. For example, when DRX is not configured, a PDCCH reception occasion (e.g., a slot having a PDCCH search space) may be continuously set in the present disclosure. Meanwhile, regardless of DRX configuration, PDCCH monitoring may be restricted in a time period set as a measurement gap.

Table 6 shows a UE procedure related to the DRX (RRC_CONNECTED state). Referring to Table 6, DRX configuration information is received through higher layer (e.g., RRC) signaling, and DRX ON/OFF is controlled by a DRX command of the MAC layer. When DRX is configured, the UE may discontinuously perform PDCCH monitoring in performing the procedure and/or method described/proposed in the present disclosure.

TABLE 6

|  | Type of signals | UE procedure |
|---|---|---|
| 1$^{st}$ step | RRC signalling (MAC-CellGroupConfig) | Reception of DRX configuration information |
| 2$^{nd}$ Step | MACCE ((Long) DRX command MAC CE) | Reception of DRX command |
| 3$^{rd}$ Step | — | Monitor a PDCCH during an 'on-duration' of a DRX cycle |

MAC-CellGroupConfig may include configuration information required to set a medium access control (MAC) parameter for a cell group. MAC-CellGroupConfig may also include configuration information on DRX. For example, MAC-CellGroupConfig may include information as follows in defining DRX.

Value of drx-OnDurationTimer: It defines a length of a start interval of a DRX cycle.
Value of drx-InactivityTimer: It defines a length of a time interval in which the UE is awake after a PDCCH occasion in which the PDCCH indicating initial UL or DL data is detected
Value of drx-HARQ-RTT-TimerDL: It defines a length of a maximum time interval until DL retransmission is received, after initial DL transmission is received.
Value of drx-HARQ-RTT-TimerUL: It defines a length of a maximum time interval until a grant for UL retransmission is received, after a grant for UL initial transmission is received.
drx-LongCycleStartOffset: It defines a time length and a start point of a DRX cycle
drx-ShortCycle (optional): It defines a time length of a short DRX cycle Here, if any one of drx-OnDurationTimer, drx-InactivityTimer, drx-HARQ-RTT-TimerDL, drx-HARQ-RTT-TimerUL is in operation, the UE performs PDCCH monitoring at every PDCCH occasion while maintaining an awake state.

Hereinafter, the proposal of the present disclosure will be described in more detail.

The following drawings were created to explain a specific example of the present specification. Since the names of specific devices or the names of specific signals/messages/fields described in the drawings are presented by way of example, the technical features of the present specification are not limited to the specific names used in the following drawings.

First, the effect of phase noise will be described.

The transmitting end performs modulation using a phase locked loop (PLL) to generate a transmission signal in the corresponding band, and the receiving end also converts the transmitted signal to a baseband using the PLL. At this time, if a high frequency band such as terahertz (THz) is used, the PLL must generate an oscillation frequency suitable for the corresponding frequency. In this case, when a high frequency is generated, a lot of phase noise is generated. Here, the power spectral density (PSD) of the phase noise generated in the PLL may be expressed as follows.

$$S(f) = PSD0 \prod_{n=1}^{N} \frac{1 + \left(\frac{f}{f_{z,n}}\right)^2}{1 + \left(\frac{f}{f_{p,n}}\right)^2} + 20\log_{10}(f_c/f_{c,base}) \quad [\text{Equation 1}]$$

That is, the PSD of the phase noise at the reference frequency generated by the PLL is generated as high as 20 log($f_c/f_{e,base}$) by increasing the frequency band. Here, $f_{z,n}$ denotes a zero frequency, $f_{p,n}$ denotes a pole frequency, and PSD0 denotes a power spectrum density when the frequency is 0, respectively. Such phase noise affects the received signal in a form of causing performance degradation in the transmission/reception process.

Equation 2 represents a baseband received signal sampled in the digital domain when only the phase noise of the receiving end is considered.

$$y[n] = \frac{1}{\sqrt{N}} \sum_{k=0}^{N-1} S_k e^{j\frac{2\pi}{N}kn} e^{j\theta[n]} + n'[n] \quad [\text{Equation 2}]$$

Here, n'[n] denotes a signal including phase noise in additive white Gaussian noise (AWGN), and θ[n] denotes a phase noise in the n$^{th}$ sample, respectively. That is, Equation 2 represents a signal in which a signal including a phase noise is added to AWGN to a signal obtained by multiplying a transmission signal by a noisy carrier exp(jθ[n]).

Here, when the signal on the m-th subcarrier is analyzed, Equation 3 is obtained.

$$\hat{S}_m = \frac{1}{N} \sum_{n=0}^{N-1} y[n] e^{-j\frac{2\pi}{N}mn} + N_m = \quad [\text{Equation 3}]$$

$$S_m \frac{1}{N} \sum_{n=0}^{N-1} e^{j\theta[n]} + \frac{1}{N} \sum_{k=0,k\neq m}^{N-1} S_k \sum_{n=0}^{N-1} e^{j\frac{2\pi n}{N}(k-m)} e^{j\theta[n]} + N_m$$

In Equation 3, $$S_m \frac{1}{N} \sum_{n=0}^{N-1} e^{j\theta[n]}$$

is the common phase noise, $$\frac{1}{N} \sum_{k=0,k\neq m}^{N-1} S_k \sum_{n=0}^{N-1} e^{j\frac{2\pi n}{N}(k-m)} e^{j\theta[n]}$$

is cross-carrier interference (ICI) due to phase noise, respectively.

On the other hand, as a specific example of the conventional phase noise cancellation method, there is a method of setting a sufficient subcarrier spacing so that a major component of the generated phase noise does not affect, and a method of removing a common phase noise by providing a phase tracking reference signal (PTRS) at regular intervals in the frequency domain and estimating an average phase.

FIG. 21 shows an example of the arrangement of PTRS that can be applied in the NR system.

Referring to FIG. 21, PTRSs may be arranged at regular subcarrier spacings. For example, in the NR mmWave band (e.g., 30 GHz), the subcarrier spacing is extended from 15 kHz to 120 kHz, and PTRS of a constant interval (e.g., 1 RE per 2 RB) may be provided. The receiving end may compensate for the phase noise in the frequency domain by calculating the average value of the PTRS for each symbol.

With respect to PTRS, as the operating frequency increases, the phase noise of the transmitting end increases. Here, PTRS plays an important role in mmWave frequency in that it can minimize the effect of oscillator phase noise on system performance. One of the main problems with which phase noise affects OFDM signals is the common phase rotation that occurs for all subcarriers, which can be called to as common phase noise (CPN) or common phase error (CPE).

The main function of PTRS is to track the phase of the local oscillator at the transmitter and receiver. PTRS allows suppression of common phase errors at mmWave frequencies. PTRS may exist in both uplink and downlink channels. Due to the phase noise characteristics, PTRS may have a low density in the frequency domain and high density in the time domain.

In an NR system, phase rotation generally affects all subcarriers in an OFDM symbol equally, but because inter-symbol correlation is low, PTRS information is mapped to some subcarriers per symbol. In the NR system, the PTRS can be configured according to the quality of the oscillator, the carrier frequency, the subcarrier spacing, and the modulation and coding scheme used in transmission.

However, when the communication area changes from the mmWave band to the THz band, the bandwidth used will be further expanded along with the change of the frequency band, and the sampling frequency will also increase accordingly.

Specifically, as the frequency of the frequency band increases, the PSD of the phase noise may increase, the degree of change of the phase noise in the time domain may increase, and the shape of the corresponding phase noise may change as the system bandwidth increases. Furthermore, in the related art, ICI of a relatively small amount does not significantly affect communication efficiency. However, as a frequency band used increases, processing/cancellation of ICI may be required.

This change in the characteristics of the phase noise may also affect the actual baseband performance. The conventional compensation for common phase noise is compensated by estimating the average of phase noise that changes during the symbol period, and the degree of change (e.g., slope, variance, etc.) itself is also relatively small. On the other hand, in the THz band, since the variation within the symbol period is relatively large, it may not be sufficient to improve communication performance only by compensating for the common phase noise. In addition, even if the above-described conventional phase noise cancellation method is applied to the THz band, a loss in performance may occur, such as a larger signal to noise ratio (SNR) increase.

Therefore, when a frequency of a high frequency band such as THz is used in a next-generation communication system, a decrease in communication efficiency due to phase noise will be further aggravated, and phase noise compensation may be an important factor affecting communication quality in a next-generation communication system. Accordingly, the present disclosure proposes a method for estimating and compensating for phase noise using PTRS in order to overcome such performance loss. However, since the arrangement of the PTRS on the time-frequency resource on the NR system is not suitable for compensating for phase noise in a high frequency band such as THz, a new arrangement method is required.

Figure 22:
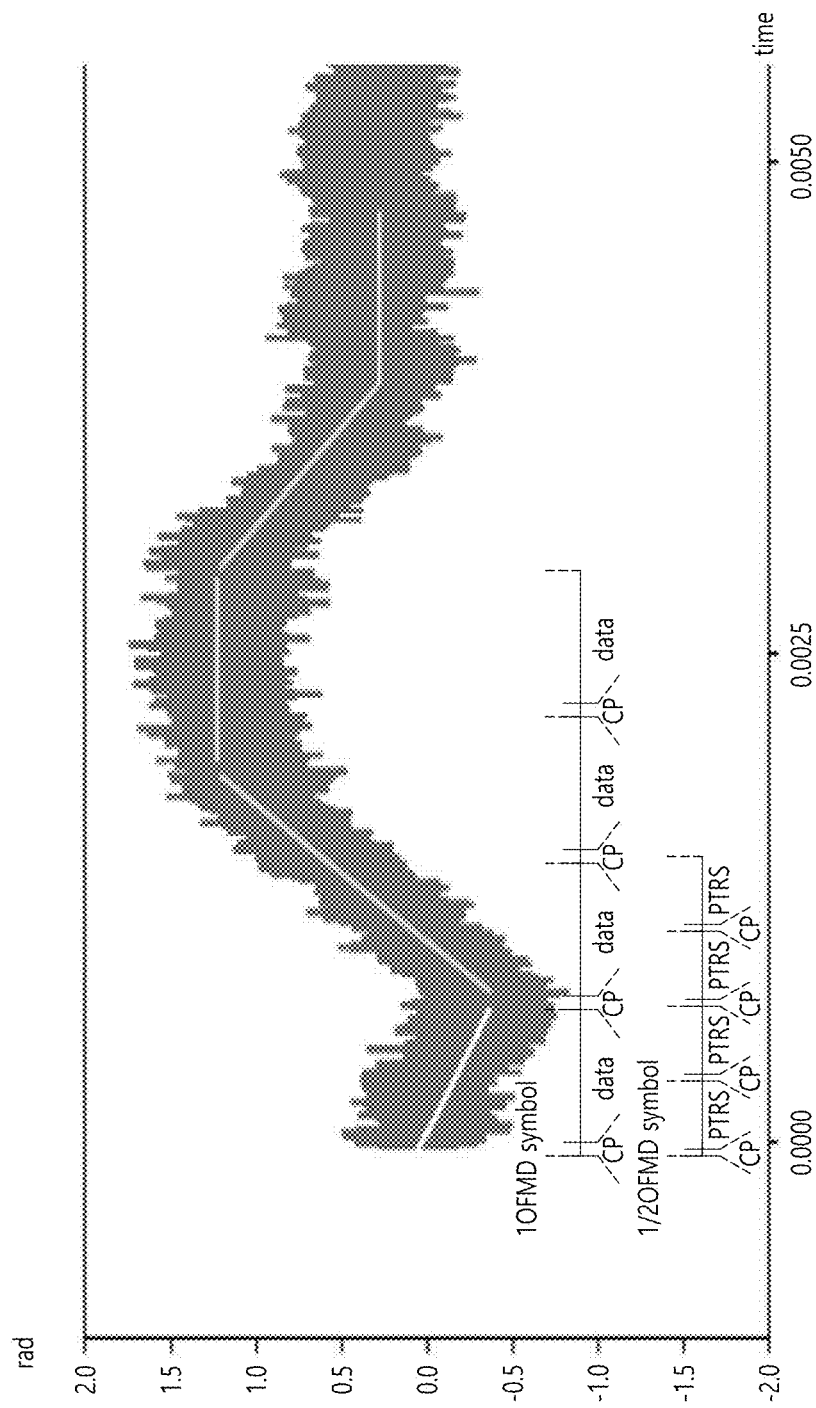
FIG. 22 schematically illustrates an example in which a symbol length for PTRS and a symbol length for data are set differently from each other according to some implementations of the present disclosure.

FIG. 22 schematically illustrates an example in which a symbol length for PTRS and a symbol length for data are set differently from each other according to some implementations of the present disclosure.

Referring to FIG. 22, by setting the symbol duration or symbol length for PTRS to be half of the symbol duration or symbol length for data, a method of estimating phase noise based on PTRS and compensating for a change amount of phase noise within a symbol duration for data service using the estimated value may be considered. Here, as an example, if the symbol duration for PTRS is half the symbol duration for data, the subcarrier spacing for PTRS may be double the subcarrier spacing for data.

The estimated phase noise may be compensated for using linear interpolation in the time domain, and data may be reconstructed in the frequency domain after compensation. Here, when the phase noise is estimated for each symbol for the PTRS as shown in FIG. 22, the phase noise can be estimated in a smaller unit than the symbol for the data, so that the phase noise compensation efficiency can be increased.

Hereinafter, the PTRS deployment methods proposed in the present disclosure will be described in more detail.

First, when the subcarrier spacing of the data channel and the subcarrier spacing of the PTRS are the same, at least one of the following rules may be applied.

(Rule 1-1) The symbols in which the PTRS is located are arranged at intervals of M (M is a natural number) symbol intervals.

(Rule 1-2) The start symbol in which the PTRS is located is a symbol separated by a symbol offset from the start of the frame.

(Rule 1-3) When a resource or a location overlaps with another signal (e.g., a non-PTRS reference signal such as a demodulation reference signal (DMRS)), the PTRS is omitted. In this case, null is also omitted.

(Rule 1-4) The resource range where the PTRS is located is limited to the resource range to which data is allocated.

(Rule 2-1) PTRS is placed in a resource spaced apart by RE offset based on the subcarrier position corresponding to 0 Hz.

(Rule 2-2) PTRSs are spaced apart in $N*2^n$ RE units (N is a natural number, n is an integer greater than or equal to 0). Here, in order to reduce the implementation burden of the UE, the UE reports its capabilities to the base station through UE capability information, etc., so that the network can determine the PTRS arrangement method, such as determining the value of n. In this case, n may be determined according to the phase locked loop (PLL) performance used by the UE.

(Rule 2-3) Based on the RE of the PTRS, a null is placed in an adjacent tone or subcarrier of the PTRS. Here, null or null data may be arranged in a positive direction and/or a negative direction. In this case, the number and direction of nulls may be determined by the base station.

(Rule 2-4) A plurality of PTRSs arranged in a combination of at least one of rules 1-1 to 1-4 and rules 2-1 to 2-3 may exist in the same frame.

Figure 23:
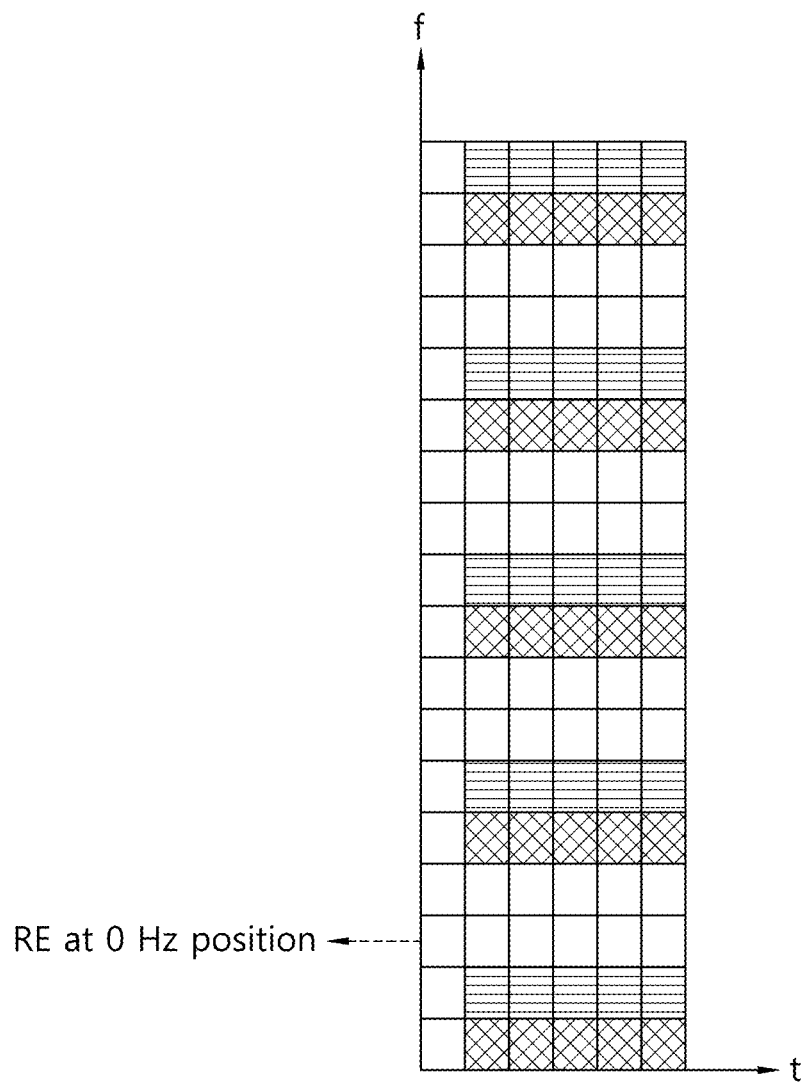
FIG. 23 schematically illustrates an example in which PTRS is deployed according to some implementations of the present disclosure.

FIG. 23 schematically illustrates an example in which PTRS is deployed according to some implementations of the present disclosure. Here, FIG. 23 is an example of a case in which the numerology for data and the numerology for PTRS are the same.

Meanwhile, in the present disclosure, numerology may mean a subcarrier spacing. For example, the larger the number of numerology, the larger the subcarrier spacing, and thus the length of the symbol may be shortened.

Referring to FIG. 23, the symbol offset is 1 by rule 1-2, the RE offset is 2 by rule 2-1, and the PTRS can be placed every symbol and every 4 REs. Meanwhile, according to Rule 2-3, a null may be disposed in each RE immediately above in both directions based on the PTRS.

Here, referring to Rule 2-3, the size of the FFT at the receiving end may be reduced through the insertion of nulls, and processing efficiency may be increased. Specifically, referring to FIG. 23, when PTRS and null are FFT-transformed, the size of the FFT can be reduced by half compared to a case in which PTRS is allocated to a null position.

Figure 24:
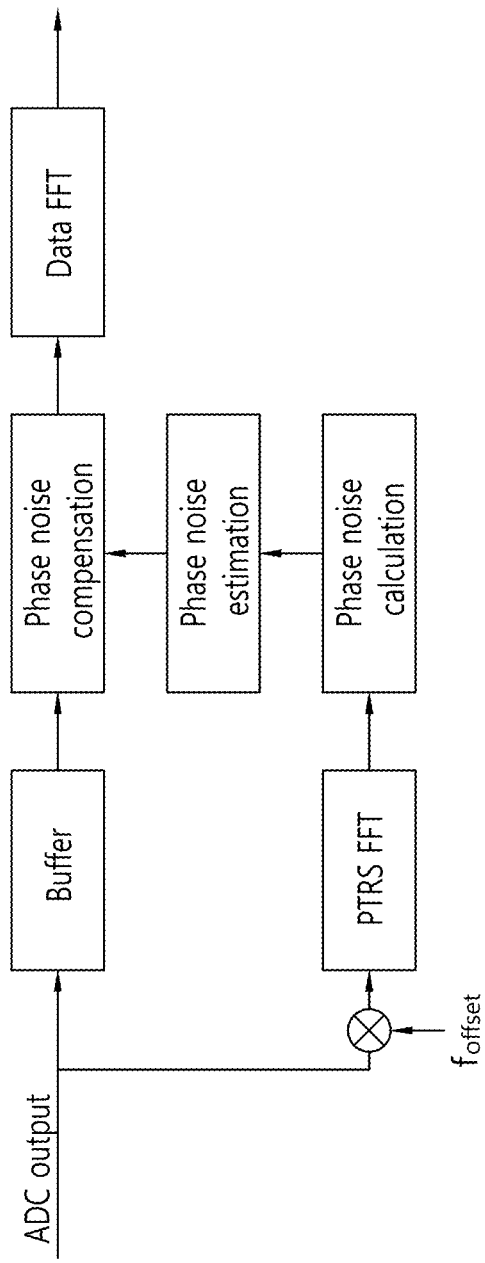
FIG. 24 schematically illustrates the structure of a receiving end of a communication device, according to some implementations of the present disclosure.

FIG. 24 schematically illustrates the structure of a receiving end of a communication device, according to some implementations of the present disclosure.

Referring to FIG. 24, a structure of a receiving end for compensating for phase noise based on PTRS on a received signal and performing FFT transform on the phase noise compensated signal is illustrated. Here, the FFT transform requires a high rate of processing time in the process of processing the received signal. Therefore, there is a need for a method for reducing the time required for FFT transform for PTRS. In relation to this, a method of reducing the time required for FFT transform by reducing the FFT size through null insertion of FIG. 23 has been described above. And, methods to be described later in the present disclosure may be additionally considered.

When the phase noise compensation method proposed in the present disclosure is applied, there is an advantage in that the structure of the receiving end of the communication device can be simplified as shown in FIG. 24.

The receiving end may have a separate FFT block for PTRS-based phase noise estimation, which may be $2^n$ times smaller than the size of the FFT block for data restoration according to some implementations of the present disclosure. In other words, the size of the FFT block for data restoration may be $2^n$ times larger than the size of the FFT block for PTRS estimation. For example, in the case of the PTRS arrangement as shown in FIG. 23, if 2048 FFTs are required for data, 1024 FFTs may be used as FFTs for PTRS estimation.

On the other hand, simply setting the symbol length to be short in the high frequency band may be a great burden in terms of processing of the receiving UE. Accordingly, it is possible to consider a method of compensating for phase noise by setting the numerology for the data and the numerology for the PTRS to be different from each other. As a specific example, a symbol length for PTRS may be set relatively short compared to a symbol length for data, and a PTRS-based phase noise compensation method in the time domain may be considered.

The subcarrier spacing of the data channel and the subcarrier spacing of the PTRS may be different from each other. In this case, at least one of the following rules may be applied.

(Rule 3-1) A separate numerology for PTRS is defined, and PTRS is arranged in the defined resource range.

At this time, in relation to the PTRS arrangement method, the above-mentioned rules may be applied. However, the interval at which the PTRS is arranged may be M (M is a natural number) RE unit.

(Rule 3-2) Defines the numerology for data, and the data is placed in the defined resource range.

In this case, the resource corresponding to the PTRS region defined in Rule 3-1 may be excluded from the data region.

(Rule 3-3) Both Rule 3-1 and Rule 3-2 apply, and at least one of Rule 3-3-1 and Rule 3-3-2, which will be described later, may additionally be applied.

(Rule 3-3-1) Align the symbol boundary to the symbol unit of the relatively smaller side of the numerology. In other words, the boundary of a symbol having a longer symbol length in the time domain is referenced.

(Rule 3-3-2) In order to define the symbol duration having a relatively larger numerology, only the data section having the smaller numerology is used by dividing the same interval, or the entire symbol duration having the smaller numerology is used by dividing into equal intervals. In other words, since the symbol length having smaller numerology is longer than the symbol length having the larger numerology, a method of arranging a plurality of data sections of a symbol having a larger numerology based on the data section of a symbol having a smaller numerology or a method of arranging a plurality of entire symbol durations of a side having a larger numerology based on the entire symbol duration of a side having a smaller numerology may be considered.

Here, as described above, the PTRS may be spaced apart by $N*2^m$ (N is a natural number, m is an integer greater than or equal to 0) RE units. Here, in order to reduce the implementation burden of the UE, the UE reports its capabilities to the base station through UE capability information, etc., so that the network can determine the PTRS arrangement method, such as determining the m value. In this case, m may be determined according to the phase locked loop (PLL) performance used by the UE.

Figure 25:
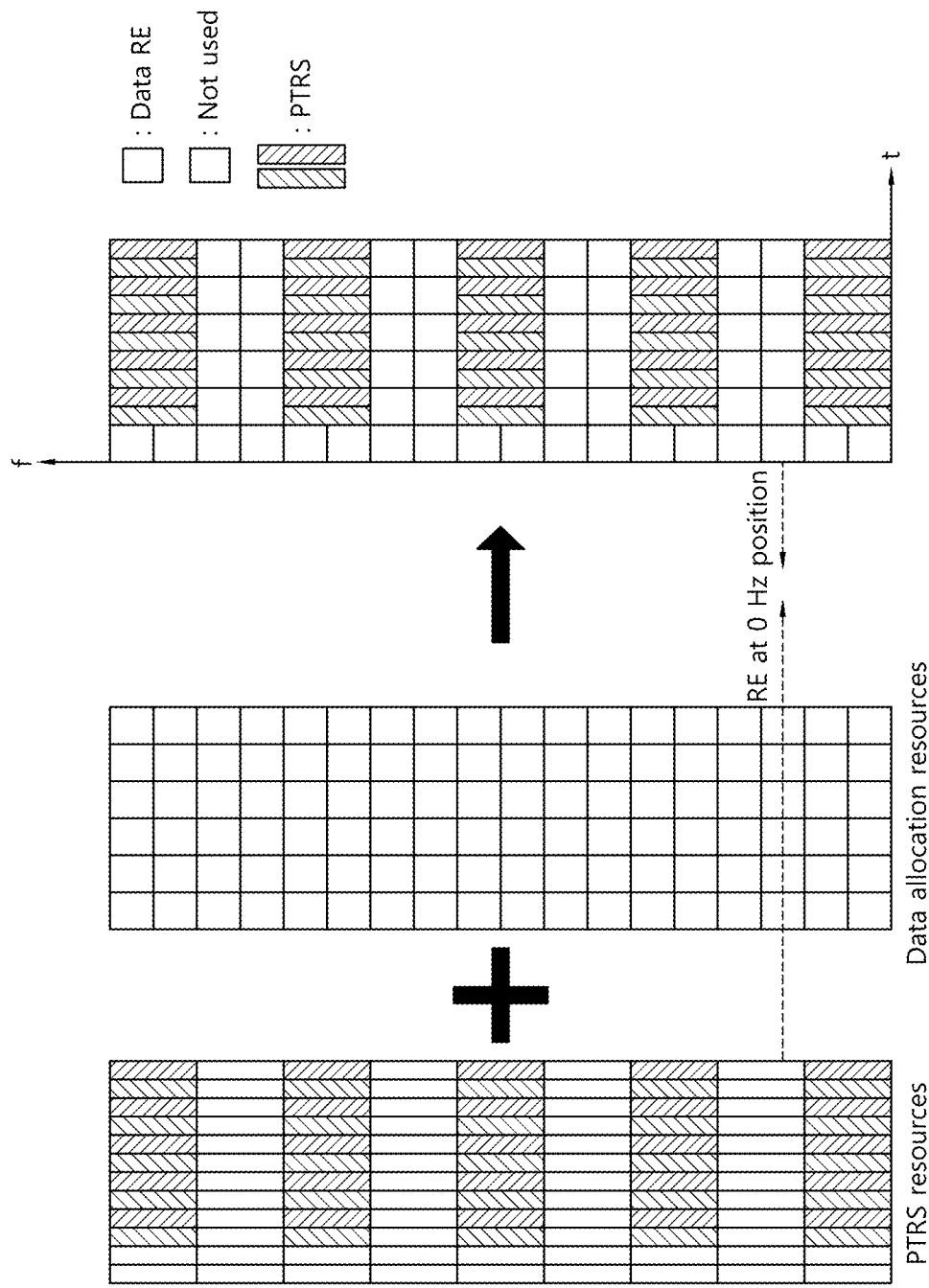
FIG. 25 schematically illustrates another example in which PTRS is deployed according to some implementations of the present disclosure.

FIG. 25 schematically illustrates another example in which PTRS is deployed according to some implementations of the present disclosure. Here, FIG. 25 is an example of a case in which the numerology for data and the numerology for PTRS are different from each other, unlike FIG. 23.

Referring to FIG. 25, an example in which the PTRS is allocated by allocating a resource for the PTRS and the results of allocating the data by allocating the resource for the data are combined with each other in the resource area is shown. Here, FIG. 25 shows an example in which the length of one symbol in the resource region for data is the same as the length of two symbols in the resource region for PTRS. In other words, the numerology for PTRS in FIG. 25 has twice the size of the numerology for the data.

Meanwhile, referring to FIG. 25, a first PTRS and a second PTRS may be allocated to resources to which the PTRS is allocated. Here, the configuration of the first PTRS and the configuration of the second PTRS may be different from each other. Alternatively, one of the first PTRS and the second PTRS may be null.

In addition, the relationship between the numerology of data and the numerology of PTRS can always be $2^k$. Specifically, the numerology for PTRS can always have a size of $2^k$ times that of the numerology for data.

On the other hand, when the numerology of the resource for the PTRS and the numerology of the resource for the data are different from each other as shown in FIG. 25, how to generate a cyclic prefix (CP) of the OFDM symbol may be a problem. In this regard, methods such as the examples of FIGS. 26 and 27 may be applied.

Figure 26:
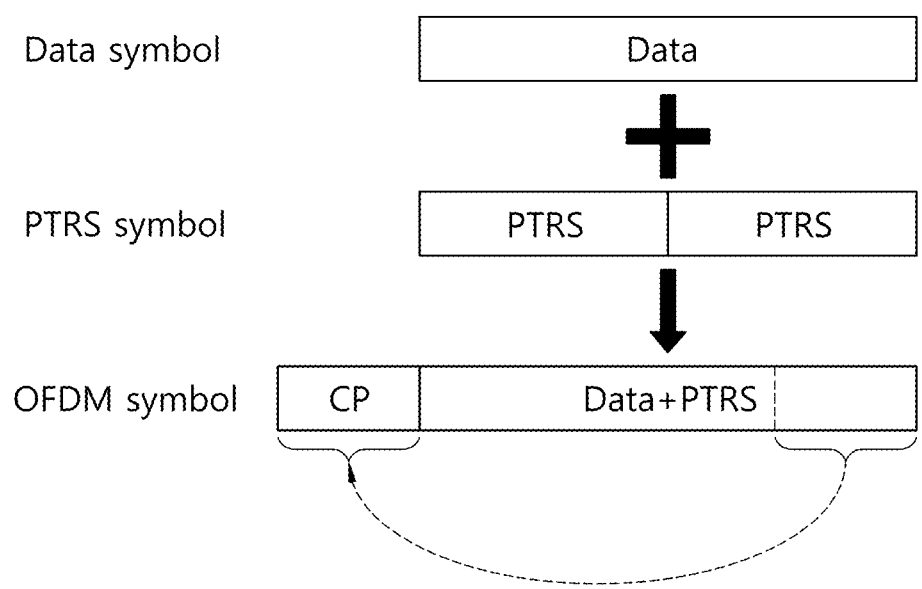
FIG. 26 schematically illustrates an example of an OFDM signal generation method according to some implementations of the present disclosure.

FIG. 26 schematically illustrates an example of an OFDM signal generation method according to some implementations of the present disclosure.

According to FIG. 26, for data symbols and PTRS symbols having different numerologies, OFDM symbols are can be configured by only the data region excluding each CP (cyclic prefix) is first combined, and then CP based on the combined data region is added. That is, FIG. 26 may be an example of a method of using only the data section having the smaller numerology of the aforementioned rule 3-3-2 by dividing as same interval.

Meanwhile, in the example of FIG. 26, the correlation characteristic of signal processing using CP at the receiving end may be relatively better, but may be vulnerable to inter-symbol interference with respect to PTRS. However, considering the THz band, the effect of delay may be insignificant.

Figure 27:
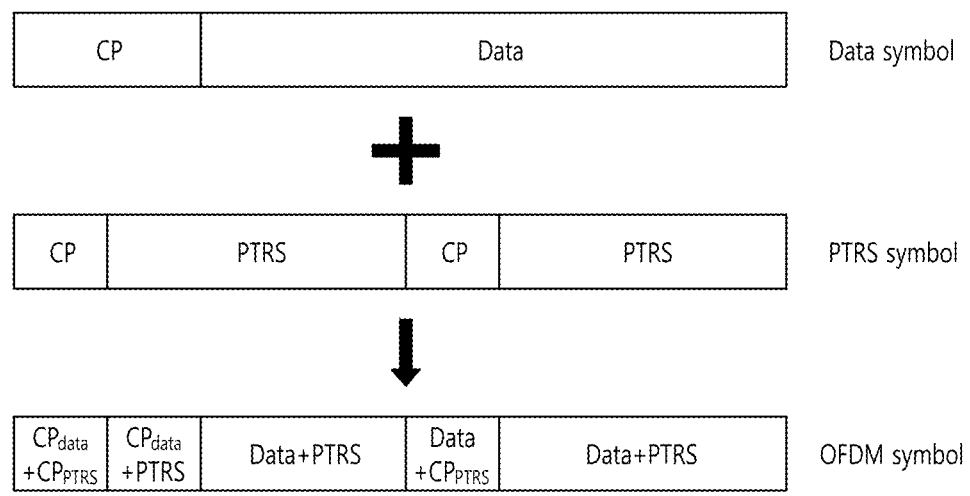
FIG. 27 schematically illustrates another example of an OFDM signal generation method according to some implementations of the present disclosure.

FIG. 27 schematically illustrates another example of an OFDM signal generation method according to some implementations of the present disclosure.

According to FIG. 27, an OFDM symbol may be configured by combining all of data symbol and all of PTRS symbol having different numerologies. That is, FIG. 27 may be an example of a method of using a symbol duration having a smaller numerology of the aforementioned rule 3-3-2 by dividing it at the same interval.

Meanwhile, as another method for reducing the FFT size, a method of separating a resource region for PTRS and a resource region for data may be considered. In this case, the following rules may apply.

(Rule 4-1) After defining a resource based on numerology for PTRS, a PTRS transmission interval is defined for a specific resource. In other words, after defining the numerology for PTRS, a PTRS dedicated resource interval is defined based on the numerology.

(Rule 4-2) After defining a resource based on numerology for data, the resource used by Rule 4-1 does not allocate data. In other words, a section other than the PTRS dedicated resource section defined by Rule 4-1 is defined as a data dedicated resource section.

Here, as an example, the resource region according to Rule 4-1, that is, the PTRS dedicated resource is defined by the base station, and the base station may signal the UE to transmit information related to the PTRS dedicated resource. Meanwhile, the resources defined by the above rules may be commonly applied to a plurality of UEs connected to the base station. Here, the base station can reduce signaling overhead by transmitting the related information to a plurality of UEs in a broadcast method.

Furthermore, it is possible to reduce the size of the FFT for estimating phase noise by separating and defining PTRS dedicated resources. Therefore, as described above, it may be more advantageous in terms of receiver implementation.

On the other hand, since the above-mentioned rules can be applied to the PTRS arrangement method, a redundant description will be omitted.

Figure 28:
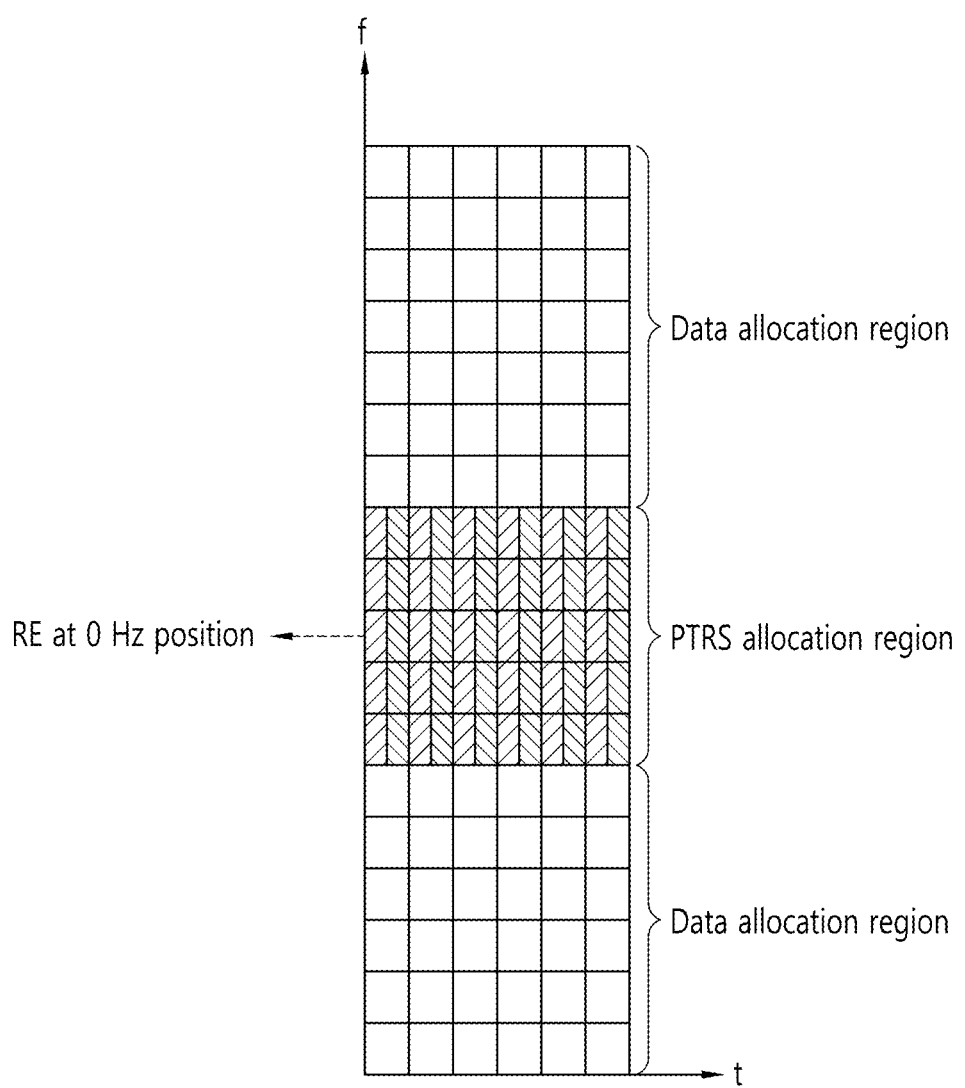
FIG. 28 illustrates an example in which a PTRS dedicated resource is defined according to some implementations of the present disclosure.

FIG. 28 illustrates an example in which a PTRS dedicated resource is defined according to some implementations of the present disclosure.

Specifically, according to FIG. 28, PTRS dedicated resources are defined based on 0 Hz, and resources other than PTRS dedicated resources may be allocated as data dedicated resources, respectively. If the PTRS dedicated resource is defined with reference to 0 Hz, processing efficiency may be increased because there is no need to perform a frequency shift for PTRS reception.

Through this method, as described above, the size of the FFT can be reduced, and further, the burden of implementing the receiver can be reduced. In addition, referring to the above, since it is possible to estimate and compensate for PTRS-based phase noise without inserting nulls, more efficient estimation and compensation are possible.

Figure 29:
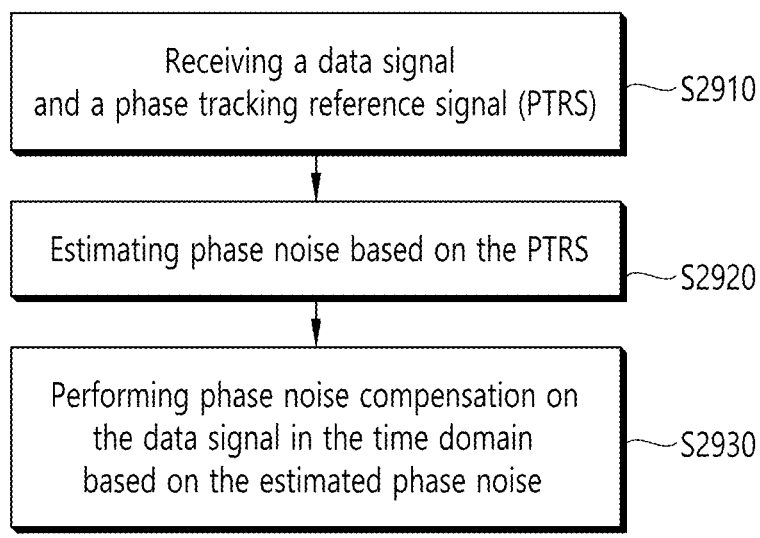
FIG. 29 is a flowchart of an example of a method for compensating for phase noise of a UE according to some implementations of the present disclosure.

FIG. 29 is a flowchart of an example of a method for compensating for phase noise of a UE according to some implementations of the present disclosure.

Referring to FIG. 29, the UE receives a data signal and a phase tracking reference signal (PTRS) (S2910). Here, the first numerology for the data signal and the second numerology for the PTRS may be different from each other. Alternatively, the first numerology for the data signal and the second numerology for the PTRS may be the same. In this case, a null may be inserted instead of the PTRS in the resource in which the PTRS is allocated.

Thereafter, the UE estimates phase noise based on the PTRS (S2920).

Thereafter, the UE performs phase noise compensation on the data signal in the time domain based on the estimated phase noise (S2930).

Here, the above-described various embodiments, such as a method for setting the first numerology and the second numerology, a method for arranging a PTRS, etc. can be applied to the example of FIG. 29 as well, and thus a redundant description will be omitted.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

The methods proposed in the present specification can be performed by the UE. In addition, the methods proposed in the present specification can be also performed by at least one computer-readable medium including an instruction based on being executed by at least one processor. The methods proposed in the present specification can be also performed by an apparatus configured to control the UE. The apparatus includes one or more processors and one or more memories operably coupled by the one or more processors and storing instructions, wherein the one or more processors execute the instructions to perform the methods proposed herein. Also, it is obvious that, according to the methods proposed in the present specification, an operation by the base station corresponding to an operation performed by the UE is considered.

Hereinafter, an example of a communication system to which the present disclosure is applied will be described.

Although not limited thereto, the various descriptions, functions, procedures, proposals, methods, and/or operation flowcharts of the present disclosure disclosed in this document may be applied to various fields requiring wireless communication/connection (e.g., 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 30:
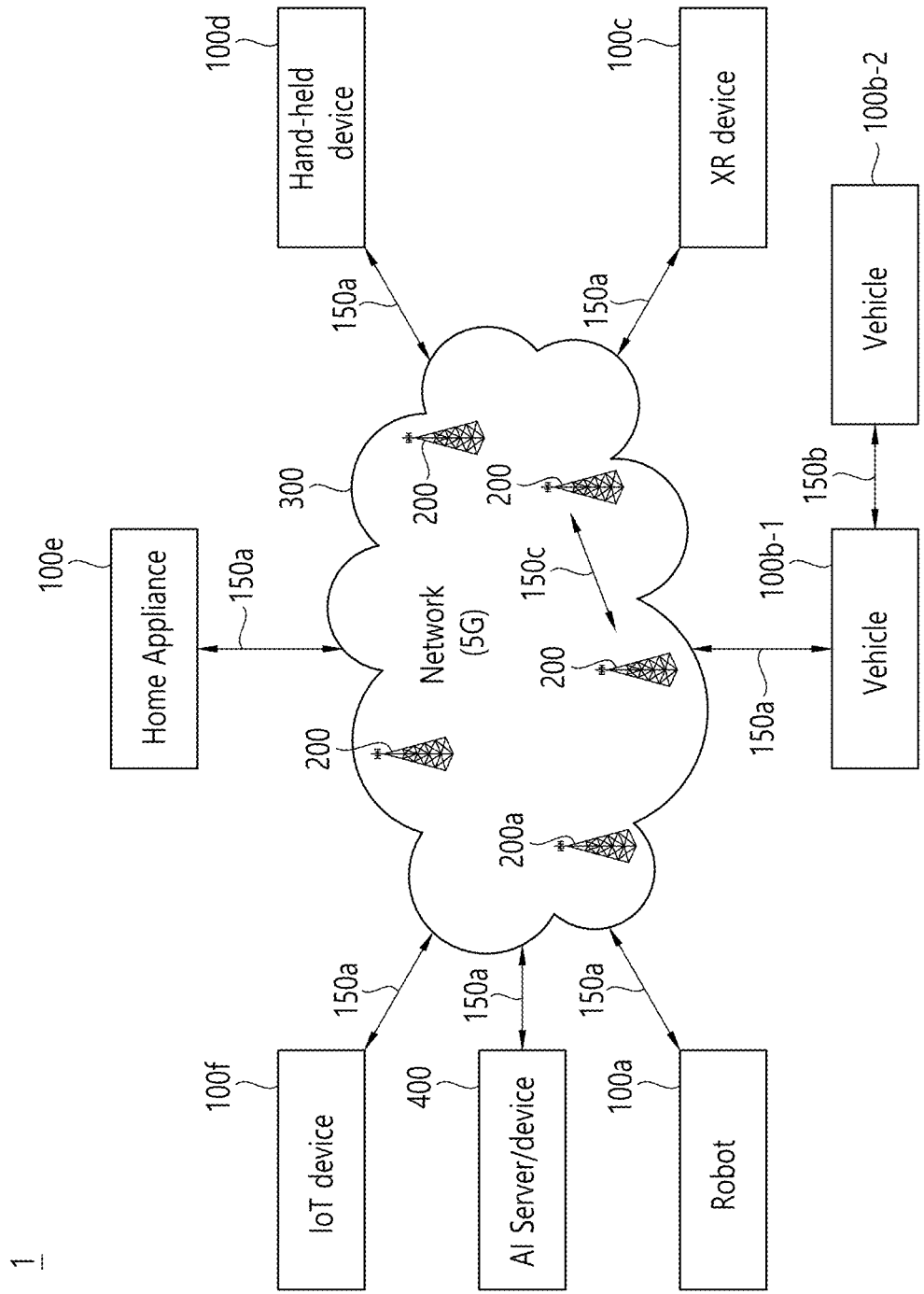
FIG. 30 illustrates a communication system 1 applied to the present specification.

FIG. 30 illustrates a communication system 1 applied to the present disclosure.

Referring to FIG. 30, the communication system 1 applied to the present disclosure includes a wireless device, a base station, and a network. Here, the wireless device refers to a device that performs communication using a wireless access technology (e.g., 5G NR (New RAT), LTE (Long Term Evolution)), and may be referred to as a communication/wireless/5G device. Although not limited thereto, the wireless device may include a robot 100a, a vehicle 100b-1, 100b-2, an eXtended Reality (XR) device 100c, a hand-held device 100d, and a home appliance 100e, an Internet of Things (IoT) device 100f, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include AR (Augmented Reality)/VR (Virtual Reality)/MR (Mixed Reality) devices, and it may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The portable device may include a smart phone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and a specific wireless device 200a may operate as a base station/network node to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). In addition, the IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Meanwhile, NR supports multiple numerologies (or sub-carrier spacing (SCS)) for supporting diverse 5G services. For example, if the SCS is 15 kHz, a wide area of the conventional cellular bands may be supported. If the SCS is 30 kHz/60 kHz, a dense-urban, lower latency, and wider carrier bandwidth is supported. If the SCS is 60 kHz or higher, a bandwidth greater than 24.25 GHz is used in order to overcome phase noise.

An NR frequency band may be defined as a frequency range of two types (FR1, FR2). Values of the frequency range may be changed. For example, the frequency range of the two types (FR1, FR2) may be as shown below in Table 7. For convenience of explanation, among the frequency ranges that are used in an NR system, FR1 may mean a "sub 6 GHz range", and FR2 may mean an "above 6 GHz range" and may also be referred to as a millimeter wave (mmW).

TABLE 7

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed. For example, as shown in Table 8 below, FR1 may include a band in the range of 410 MHz to 7125 MHz. That is, FR1 may include a frequency band of at least 6 GHz (or 5850, 5900, 5925 MHz, and so on). For example, a frequency band of at least 6 GHz (or 5850, 5900, 5925 MHz, and so on) included in FR1 may include an unlicensed band. The unlicensed band may be used for diverse purposes, e.g., the unlicensed band for vehicle-specific communication (e.g., automated driving).

TABLE 8

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Hereinafter, an example of a wireless device to which the present disclosure is applied will be described.

Figure 31:
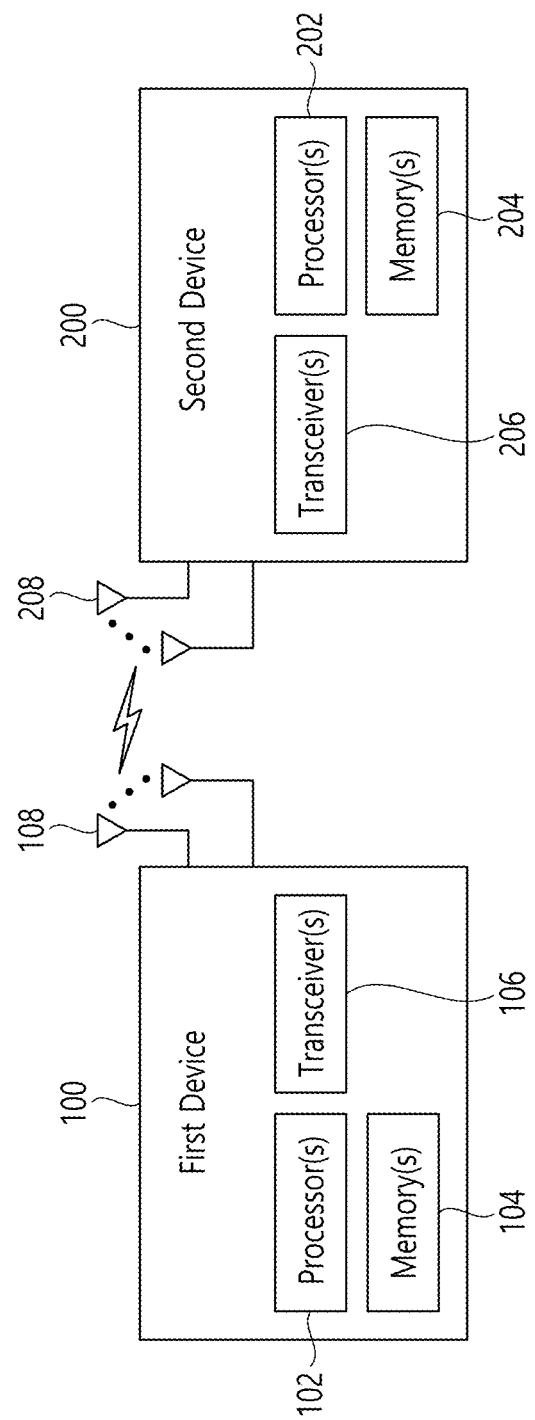
FIG. 31 illustrates a wireless device applicable to the present disclosure.

FIG. 31 illustrates a wireless device applicable to the present disclosure.

Referring to FIG. 31, the first wireless device 100 and the second wireless device 200 may transmit and receive wireless signals through various wireless access technologies (e.g., LTE, NR). Here, {first wireless device 100, second wireless device 200} may correspond to {wireless device 100x, base station 200} and/or {wireless device 100x, wireless device 100x} of FIG. 30.

The first wireless device 100 may include one or more processors 102 and one or more memories 104 and additionally further include one or more transceivers 106 and/or one or more antennas 108. The processors 102 may control the memory 104 and/or the transceivers 106 and may be configured to implement the descriptions, functions, procedures, proposals, methods, and/or operational flowcharts disclosed in this document. For example, the processors 102 may process information within the memory 104 to generate first information/signals and then transmit radio signals including the first information/signals through the transceivers 106. In addition, the processor 102 may receive radio signals including second information/signals through the transceiver 106 and then store information obtained by processing the second information/signals in the memory 104. The memory 104 may be connected to the processor 102 and may store a variety of information related to operations of the processor 102. For example, the memory 104 may store software code including commands for performing a part or the entirety of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. The transceiver 106 may include a transmitter and/or a receiver. The transceiver 106 may be interchangeably used with a radio frequency (RF) unit. In the present disclosure, the wireless device may represent a communication modem/circuit/chip.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signals and then transmit radio signals including the third information/signals through the transceiver 206. In addition, the processor 202 may receive radio signals including fourth information/signals through the transceiver 106 and then store information obtained by processing the fourth information/signals in the memory 204. The memory 204 may be connected to the processor 202 and may store a variety of information related to operations of the processor 202. For example, the memory 204 may store software code including commands for performing a part or the entirety of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. The transceiver 206 may include a transmitter and/or a receiver. The transceiver 206 may be interchangeably used with an RF unit. In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. In addition, the one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. In addition, the one or more processors 102 and 202 may perform control so that the one or more transceivers 106 and 206 may receive user data, control information, or radio signals from one or more other devices. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Hereinafter, an example of a signal processing circuit to which the present disclosure is applied will be described.

Figure 32:
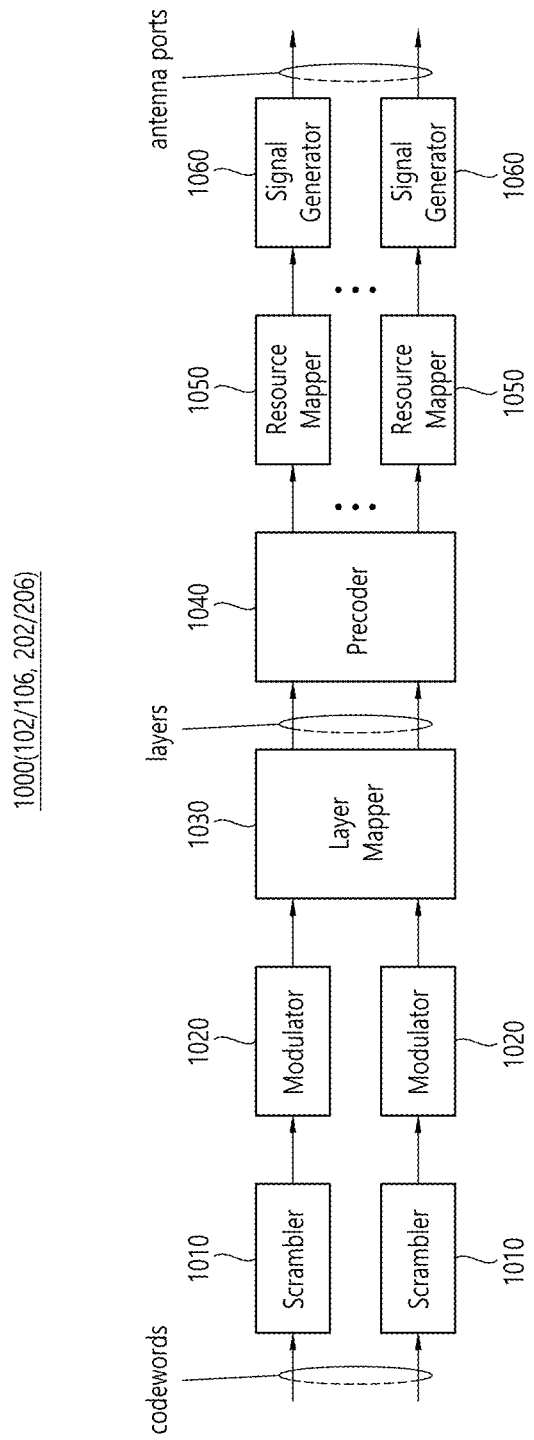
FIG. 32 illustrates a signal processing circuit for a transmission signal.

FIG. 32 exemplifies a signal processing circuit for a transmission signal.

Referring to FIG. 32, a signal processing circuit 1000 includes a scrambler 1010, a modulator 1020, a layer mapper 1030, a precoder 1040, a resource mapper 1050, and a signal generator 1060. The operations/functions of FIG. 32 may be performed in the processors 102 and 202 and/or the transceivers 106 and 206 of FIG. 31 but are not limited thereto. The hardware elements of FIG. 32 may be implemented in the processors 102 and 202 and/or the transceivers 106 and 206 of FIG. 31. For example, blocks 1010 to 1060 may be implemented in the processors 102 and 202 of FIG. 31. In addition, blocks 1010 to 1050 may be implemented in the processors 102 and 202 of FIG. 31, and block 1060 may be implemented in the transceivers 106 and 206 of FIG. 31.

A codeword may be converted into a wireless signal through the signal processing circuit 1000 of FIG. 32. Here, the codeword is an encoded bit sequence of an information block. The information block may include a transport block (e.g., a UL-SCH transport block or a DL-SCH transport block). The wireless signal may be transmitted through various physical channels (e.g., PUSCH or PDSCH).

Specifically, the codeword may be converted into a scrambled bit sequence by the scrambler 1010. The scramble sequence used for scrambling is generated based on an initialization value, and the initialization value may include ID information of a wireless device. The scrambled bit sequence may be modulated by the modulator 1020 into a modulation symbol sequence. The modulation scheme may include pi/2-binary phase shift keying (pi/2-BPSK), m-phase shift keying (m-PSK), m-quadrature amplitude modulation (m-QAM), and the like. The complex modulation symbol sequence may be mapped to one or more transport layers by the layer mapper 1030. The modulation symbols of each transport layer may be mapped to the corresponding antenna port(s) by the precoder 1040 (precoding). An output z of the precoder 1040 may be obtained by multiplying an output y of the layer mapper 1030 by an N*M precoding matrix W. Here, N is the number of antenna ports and M is the number of transmission layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to a time-frequency resource. The time-frequency resource may include a plurality of symbols (e.g., CP-OFDMA symbols or DFT-s-OFDMA symbols) in a time domain and may include a plurality of subcarriers in a frequency domain. The signal generator 1060 may generate a wireless signal from the mapped modulation symbols, and the generated wireless signal may be transmitted to another device through each antenna. To this end, the signal generator 1060 may include an inverse fast Fourier transform (IFFT) module, a cyclic prefix (CP) inserter, a digital-to-analog converter (DAC), a frequency uplink converter, and the like.

A signal processing process for a received signal in the wireless device may be configured as the reverse of the signal processing process (1010 to 1060) of FIG. 32. For example, a wireless device (e.g., 100 or 200 in FIG. 31) may receive a wireless signal from the outside through an antenna port/transmitter. The received wireless signal may be converted into a baseband signal through a signal restorer. To this end, the signal restorer may include a frequency downlink converter, an analog-to-digital converter (ADC), a CP canceller, and a fast Fourier transform (FFT) module. Thereafter, the baseband signal may be restored into a codeword through a resource de-mapper process, a postcoding process, a demodulation process, and a de-scramble process. The codeword may be restored to an original information block through decoding. Accordingly, a signal processing circuit (not shown) for a received signal may include a signal restorer, a resource demapper, a postcoder, a demodulator, a descrambler, and a decoder.

Hereinafter, an example of utilization of a wireless device to which the present disclosure is applied will be described.

Figure 33:
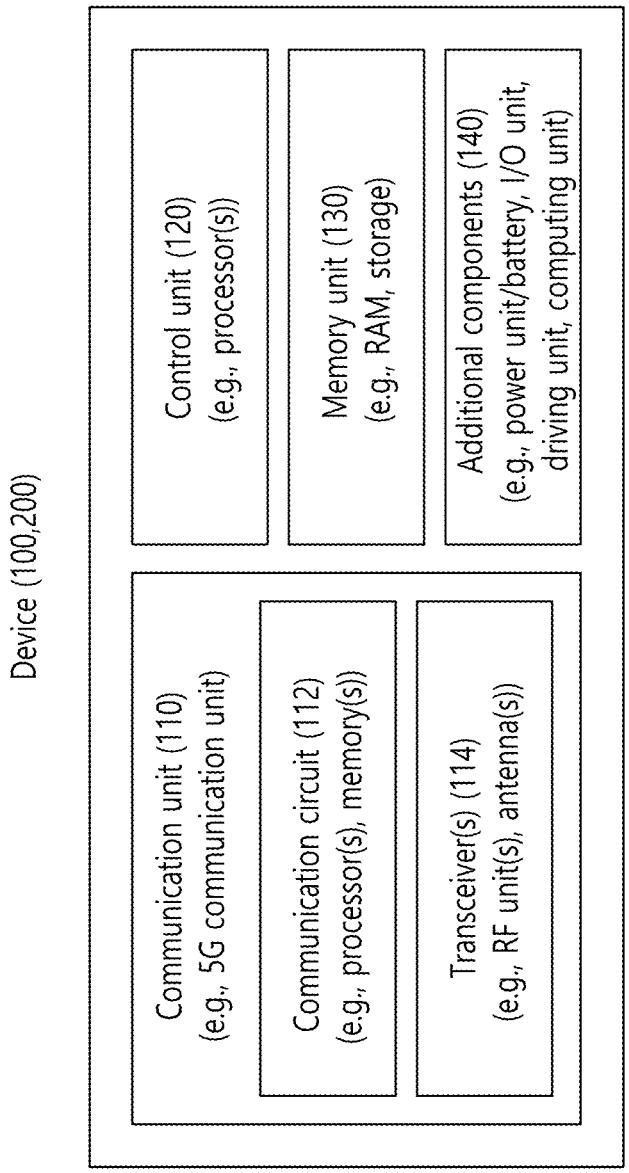
FIG. 33 shows another example of a wireless device applied to the present disclosure.

FIG. 33 shows another example of a wireless device applied to the present disclosure. The wireless device can be implemented in various forms according to use-examples/services (Refer to FIG. 30).

Referring to FIG. 33, wireless devices (100, 200) may correspond to the wireless devices (100, 200) of FIG. 31 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 31. For example, the transceiver(s) (114) may include the one or more transceivers (106, 206) and/or the one or more antennas (108, 208) of FIG. 31. The control unit (120) is electrically connected to the communication unit (110), the memory (130), and the additional components (140) and controls overall operation of the wireless devices. For example, the control unit (120) may control an electric/mechanical operation of the wireless device based on programs/code/instructions/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 30), the vehicles (100b-1, 100b-2 of FIG. 30), the XR device (100c of FIG. 30), the hand-held device (100d of FIG. 30), the home appliance (100e of FIG. 30), the IoT device (100f of FIG. 30), a digital broadcast UE, a hologram device, a public safety device, an MTC device, a medicine device, a fintech device (or a finance device), a security device, a climate/environment device, the AI server/device (400 of FIG. 30), the BSs (200 of FIG. 30), a network node, and so on. The wireless device may be used in a mobile or fixed place according to a usage-example/service.

In FIG. 33, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 33 will be described in detail with reference to the drawings.

Hereinafter, an example of a mobile device to which the present disclosure is applied will be described.

Figure 34:
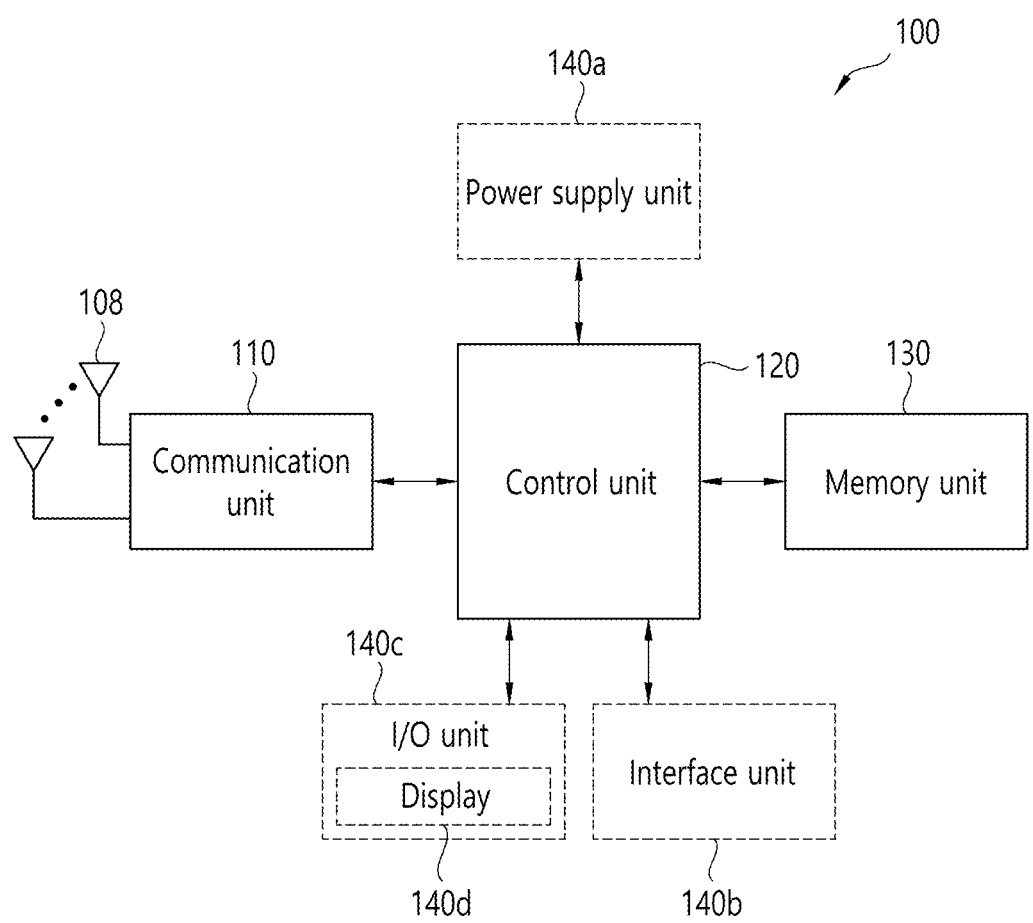
FIG. 34 illustrates a portable device applied to the present disclosure.

FIG. 34 illustrates a portable device applied to the present disclosure. The portable device may include a smartphone, a smart pad, a wearable device (e.g., smart watch or smart glasses), a portable computer (e.g., a notebook), etc. The portable device may be referred to as a mobile station (MS), a user terminal (UT), a mobile subscriber station (MSS), a subscriber station (SS), an advanced mobile station (AMS), or a wireless terminal (WT).

Referring to FIG. 34, the portable device 100 may include an antenna unit 108, a communication unit 110, a controller 120, a memory unit 130, a power supply unit 140a, an interface unit 140b, and input/output unit 140c. The antenna unit 108 may be configured as a part of the communication unit 110. Blocks 110 to 130/140a to 140c correspond to blocks 110 to 130/140 of FIG. 33, respectively.

The communication unit 110 may transmit and receive signals (e.g., data, control signals, etc.) with other wireless devices and BSs. The controller 120 may perform various operations by controlling components of the portable device 100. The controller 120 may include an application processor (AP). The memory unit 130 may store data/parameters/programs/codes/commands required for driving the portable device 100. Also, the memory unit 130 may store input/output data/information, and the like. The power supply unit 140a supplies power to the portable device 100 and may include a wired/wireless charging circuit, a battery, and the like. The interface unit 140b may support connection between the portable device 100 and other external devices. The interface unit 140b may include various ports (e.g., audio input/output ports or video input/output ports) for connection with external devices. The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in the case of data communication, the input/output unit 140c acquires information/signals (e.g., touch, text, voice, image, or video) input from the user, and the acquired information/signals may be stored in the memory unit 130. The communication unit 110 may convert information/signals stored in the memory into wireless signals and may directly transmit the converted wireless signals to other wireless devices or to a BS. In addition, after receiving a wireless signal from another wireless device or a BS, the communication unit 110 may restore the received wireless signal to the original information/signal. The restored information/signal may be stored in the memory unit 130 and then output in various forms (e.g., text, voice, image, video, or haptic) through the input/output unit 140c.

Hereinafter, an example of a vehicle to which the present disclosure is applied or an autonomous driving vehicle will be described.

Figure 35:
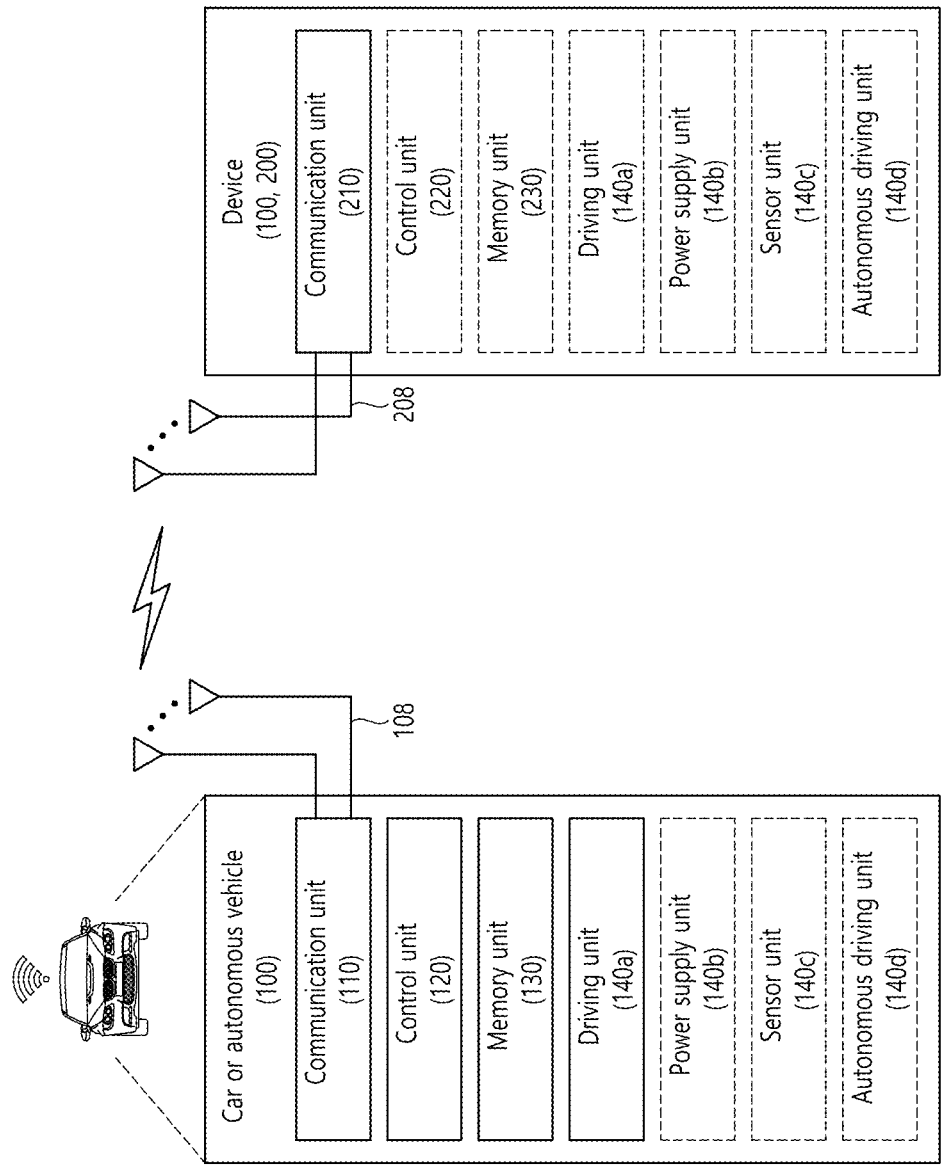
FIG. 35 illustrates a vehicle or an autonomous driving vehicle applied to the present disclosure.

FIG. 35 illustrates a vehicle or an autonomous vehicle applied to the present disclosure. A vehicle or an autonomous vehicle may be implemented as a moving robot, a vehicle, a train, an aerial vehicle (AV), a ship, or the like.

Referring to FIG. 35, a vehicle or autonomous vehicle 100 includes an antenna unit 108, a communication unit 110, a control unit 120, a driving unit 140a, a power supply unit 140b, and a sensor unit 140c, and an autonomous driving unit 140d. The antenna unit 108 may be configured as a portion of the communication unit 110. Blocks 110/130/140a to 140d correspond to blocks 110/130/140 of FIG. 33, respectively.

The communication unit 110 may transmit and receive signals (e.g., data, control signals, etc.) with external devices such as other vehicles, base stations (BSs) (e.g. base station, roadside unit, etc.), and servers. The control unit 120 may perform various operations by controlling elements of the vehicle or the autonomous vehicle 100. The control unit 120 may include an electronic control unit (ECU). The driving unit 140a may cause the vehicle or the autonomous vehicle 100 to travel on the ground. The driving unit 140a may include an engine, a motor, a power train, a wheel, a brake, a steering device, and the like. The power supply unit 140b supplies power to the vehicle or the autonomous vehicle 100, and may include a wired/wireless charging circuit, a battery, and the like. The sensor unit 140c may obtain vehicle status, surrounding environment information, user information, and the like. The sensor unit 140c may include an inertial measurement unit (IMU) sensor, a collision sensor, a wheel sensor, a speed sensor, an inclination sensor, a weight detection sensor, a heading sensor, a position module, a vehicle forward/reverse sensor, a battery sensor, a fuel sensor, a tire sensor, a steering sensor, a temperature sensor, a humidity sensor, an ultrasonic sensor, an illuminance sensor, a pedal position sensor, etc. The autonomous driving unit 140d may implement a technology of maintaining a driving lane, a technology of automatically adjusting a speed such as adaptive cruise control, a technology of automatically traveling along a predetermined route, and a technology of automatically setting a route and traveling when a destination is set.

For example, the communication unit 110 may receive map data, traffic information data, and the like from an external server. The autonomous driving unit 140d may generate an autonomous driving route and a driving plan based on the acquired data. The control unit 120 may control the driving unit 140a so that the vehicle or the autonomous vehicle 100 moves along the autonomous driving route according to the driving plan (e.g., speed/direction adjustment). During autonomous driving, the communication unit 110 may asynchronously/periodically acquire the latest traffic information data from an external server and may acquire surrounding traffic information data from surrounding vehicles. In addition, during autonomous driving, the sensor unit 140c may acquire vehicle state and surrounding environment information. The autonomous driving unit 140d may update the autonomous driving route and the driving plan based on newly acquired data/information. The communication unit 110 may transmit information on a vehicle location, an autonomous driving route, a driving plan, and the like to the external server. The external server may predict traffic information data in advance using AI technology or the like based on information collected from the vehicle or autonomous vehicles and may provide the predicted traffic information data to the vehicle or autonomous vehicles.

Hereinafter, examples of AR/VR and vehicles to which the present disclosure is applied will be described.

Figure 36:
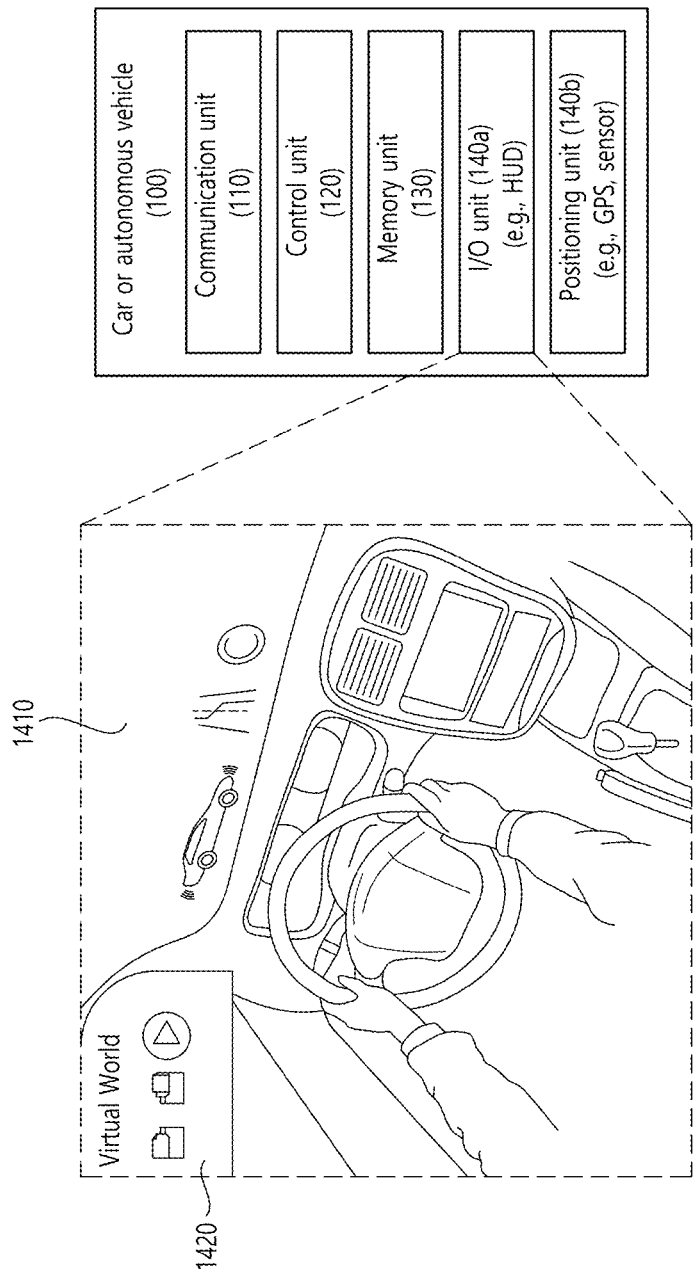
FIG. 36 illustrates a vehicle applied to the present disclosure.

FIG. 36 illustrates a vehicle applied to the present disclosure. Vehicles may also be implemented as means of transportation, trains, aircraft, and ships.

Referring to FIG. 36, the vehicle 100 may include a communication unit 110, a control unit 120, a memory unit 130, an input/output unit 140a, and a position measurement unit 140b. Here, blocks 110 to 130/140a to 140d correspond to blocks 110 to 130/140 of FIG. 33, respectively.

The communication unit 110 may transmit and receive signals (e.g., data, control signals, etc.) with other vehicles or external devices such as a BS. The control unit 120 may perform various operations by controlling components of the vehicle 100. The memory unit 130 may store data/parameters/programs/codes/commands supporting various functions of the vehicle 100. The input/output unit 140a may output an AR/VR object based on information in the memory unit 130. The input/output unit 140a may include a HUD. The location measurement unit 140b may acquire location information of the vehicle 100. The location information may include absolute location information of the vehicle 100, location information within a driving line, acceleration information, location information with surrounding vehicles, and the like. The location measurement unit 140b may include a GPS and various sensors.

For example, the communication unit 110 of the vehicle 100 may receive map information, traffic information, etc., from an external server and store the information in the memory unit 130. The location measurement unit 140b may acquire vehicle location information through GPS and various sensors and store the vehicle location information in the memory unit 130. The control unit 120 may generate a virtual object based the on map information, the traffic information, the vehicle location information, and the like, and the input/output unit 140a may display the generated virtual object on a window of the vehicle (1410, 1420). In addition, the control unit 120 may determine whether the vehicle 100 is operating normally within a driving line based on vehicle location information. When the vehicle 100 deviates from the driving line abnormally, the control unit 120 may display a warning on a windshield of the vehicle through the input/output unit 140a. In addition, the control unit 120 may broadcast a warning message regarding a driving abnormality to nearby vehicles through the communication unit 110. Depending on a situation, the control unit 120 may transmit location information of the vehicle and information on driving/vehicle abnormalities to related organizations through the communication unit 110.

Hereinafter, an example of an XR device to which the present disclosure is applied will be described.

Figure 37:
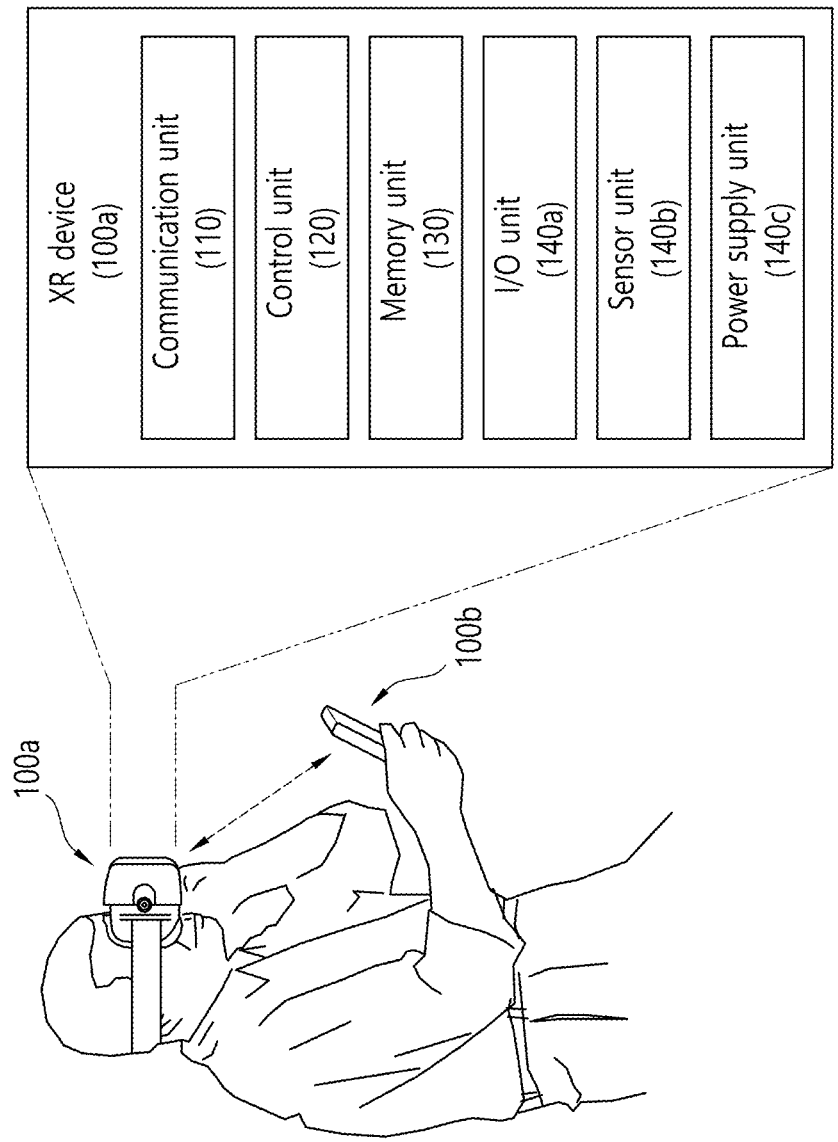
FIG. 37 illustrates an XR device applied to the present disclosure.

FIG. 37 illustrates an XR device applied to the present disclosure. The XR device may be implemented as an HMD, a head-up display (HUD) provided in a vehicle, a television, a smartphone, a computer, a wearable device, a home appliance, a digital signage, a vehicle, a robot, and the like.

Referring to FIG. 37, the XR device 100a may include a communication unit 110, a control unit 120, a memory unit 130, an input/output unit 140a, a sensor unit 140b, and a power supply unit 140c. Here, blocks 110 to 130/140a to 140c correspond to blocks 110 to 130/140 of FIG. 33, respectively.

The communication unit 110 may transmit and receive signals (e.g., media data, control signals, etc.) with external devices such as other wireless devices, portable devices, media servers. Media data may include images, sounds, and the like. The control unit 120 may perform various operations by controlling components of the XR device 100a. For example, the control unit 120 may be configured to control and/or perform procedures such as video/image acquisition, (video/image) encoding, and metadata generating and processing. The memory unit 130 may store data/parameters/programs/codes/commands required for driving the XR device 100a/generating an XR object. The input/output unit 140a may obtain control information, data, etc. from the outside and may output the generated XR object. The input/output unit 140a may include a camera, a microphone, a user input unit, a display unit, a speaker, and/or a haptic module. The sensor unit 140b may obtain XR device status, surrounding environment information, user information, and the like. The sensor unit 140b may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar. The power supply unit 140c may supply power to the XR device 100a and may include a wired/wireless charging circuit, a battery, and the like.

As an example, the memory unit 130 of the XR device 100a may include information (e.g., data, etc.) necessary for generating an XR object (e.g., AR/VR/MR object). The input/output unit 140a may acquire a command to manipulate the XR device 100a from a user, and the control unit 120 may drive the XR device 100a according to the user's driving command. For example, when the user tries to watch a movie, news, etc., through the XR device 100a, the control unit 120 may transmit content request information through the communication unit 130 to another device (for example, the portable device 100b) or to a media server. The communication unit 130 may download/stream content such as movies and news from another device (e.g., the portable device 100b) or the media server to the memory unit 130. The control unit 120 may control and/or perform procedures such as video/image acquisition, (video/image) encoding, and metadata generating/processing for the content, and generate/output an XR object based on information on a surrounding space or a real object through the input/output unit 140a/sensor unit 140b.

In addition, the XR device 100a may be wirelessly connected to the portable device 100b through the communication unit 110, and an operation of the XR device 100a may be controlled by the portable device 100b. For example, the portable device 100b may operate as a controller for the XR device 100a. To this end, the XR device 100a may acquire 3D location information of the portable device 100b, generate an XR entity corresponding to the portable device 100b, and output the generated XR entity.

Hereinafter, an example of a robot to which the present disclosure is applied will be described.

Figure 38:
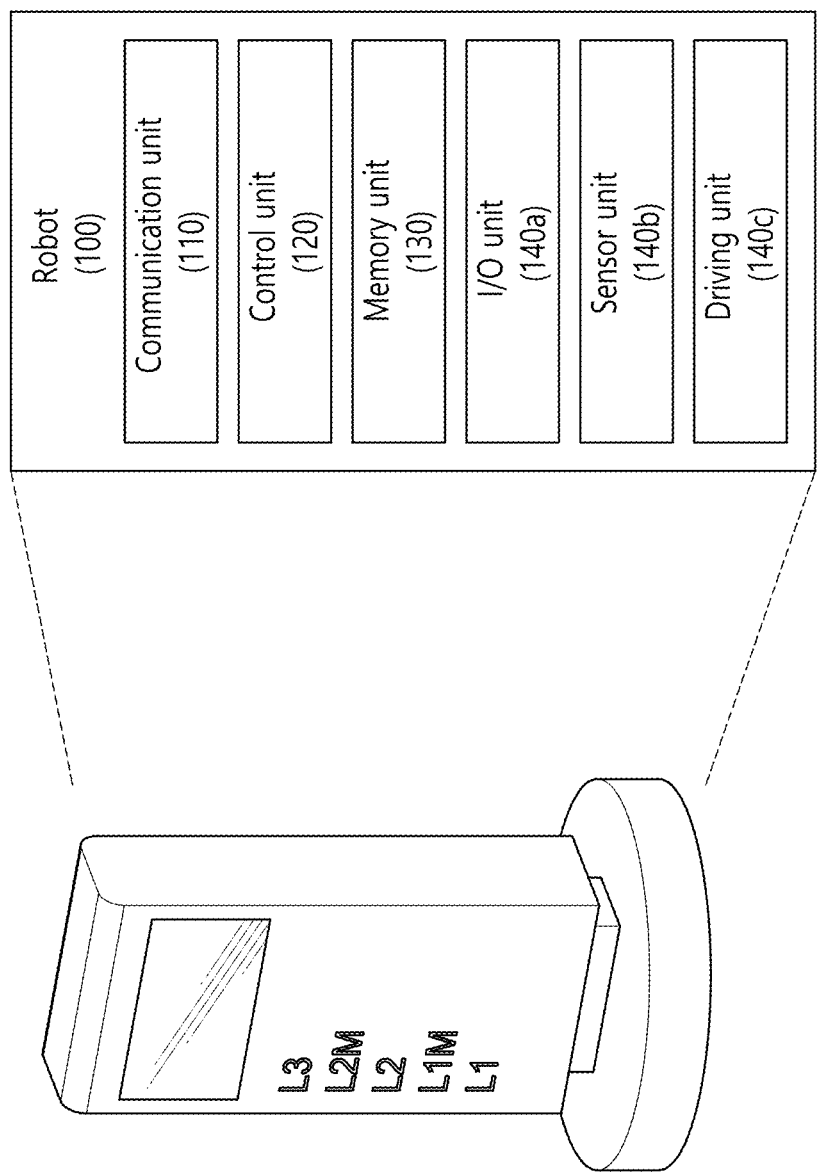
FIG. 38 illustrates a robot applied to the present disclosure.

FIG. 38 illustrates a robot applied to the present disclosure. Robots may be classified as industrial, medical, household, military, etc. depending on the purpose or field of use.

Referring to FIG. 38, a robot 100 may include a communication unit 110, a control unit 120, a memory unit 130, an input/output unit 140a, a sensor unit 140b, and a driving unit 140c. Here, blocks 110 to 130/140a to 140d correspond to blocks 110 to 130/140 of FIG. 33, respectively.

The communication unit 110 may transmit and receive signals (e.g., driving information, control signals, etc.) with other wireless devices, other robots, or external devices such as a control server. The control unit 120 may perform various operations by controlling components of the robot 100. The memory unit 130 may store data/parameters/programs/codes/commands supporting various functions of the robot 100. The input/output unit 140a may acquire information from the outside of the robot 100 and may output the information to the outside of the robot 100. The input/output unit 140a may include a camera, a microphone, a user input unit, a display unit, a speaker, and/or a haptic module. The sensor unit 140b may obtain internal information, surrounding environment information, user information, and the like of the robot 100. The sensor unit 140b may include a proximity sensor, an illuminance sensor, an acceleration sensor, a magnetic sensor, a gyro sensor, an inertial sensor, an IR sensor, a fingerprint recognition sensor, an ultrasonic sensor, an optical sensor, a microphone, a radar, and the like. The driving unit 140c may perform various physical operations such as moving a robot joint. In addition, the driving unit 140c may cause the robot 100 to travel on the ground or fly in the air. The driving unit 140c may include an actuator, a motor, a wheel, a brake, a propeller, and the like.

Hereinafter, an example of an AI device to which the present disclosure is applied will be described.

Figure 39:
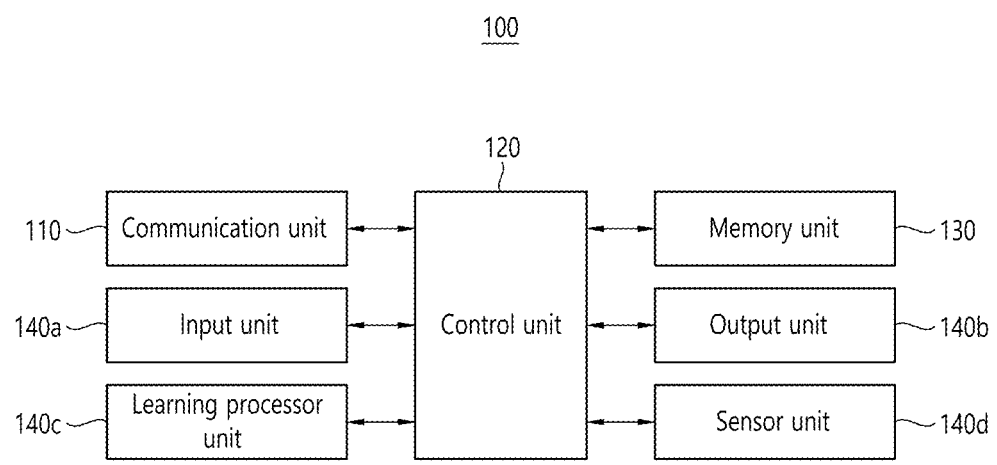
FIG. 39 illustrates an AI device applied to the present disclosure.

FIG. 39 illustrates an AI device applied to the present disclosure. AI devices may be implemented as fixed devices or moving devices such as TVs, projectors, smartphones, PCs, notebooks, digital broadcasting UEs, tablet PCs, wearable devices, set-top boxes (STBs), radios, washing machines, refrigerators, digital signage, robots, vehicles, etc.

Referring to FIG. 39, the AI device 100 may include a communication unit 110, a control unit 120, a memory unit 130, an input/output unit 140a/140b, a learning processor unit 140c, and a sensor unit. Blocks 110 to 130/140a to 140d correspond to blocks 110 to 130/140 of FIG. 33, respectively.

The communication unit 110 may transmit and receive wireless signals (e.g., sensor information, user input, learning model, control signals, etc.) with external devices such as another AI device (e.g., FIG. 30, 100x, 200, or 400) or an AI server (e.g., 400 in FIG. 30) using wired/wireless communication technology. To this end, the communication unit 110 may transmit information in the memory unit 130 to an external device or may transfer a signal received from the external device to the memory unit 130.

The control unit 120 may determine at least one executable operation of the AI device 100 based on information determined or generated using a data analysis algorithm or a machine learning algorithm. In addition, the control unit 120 may perform a determined operation by controlling the components of the AI device 100. For example, the control unit 120 may request, search, receive, or utilize data from the learning processor unit 140c or the memory unit 130, and may control components of the AI device 100 to execute a predicted operation among at least one an executable operation or an operation determined to be desirable. In addition, the control unit 120 may collect history information including operation content of the AI device 100 or the user's feedback on the operation, and store the collected information in the memory unit 130 or the learning processor unit 140c or transmit the information to an external device such as an AI server (400 of FIG. 30). The collected historical information may be used to update a learning model.

The memory unit 130 may store data supporting various functions of the AI device 100. For example, the memory unit 130 may store data obtained from the input unit 140a, data obtained from the communication unit 110, output data from the learning processor unit 140c, and data obtained from the sensing unit 140. In addition, the memory unit 130 may store control information and/or software codes necessary for the operation/execution of the control unit 120.

The input unit 140a may acquire various types of data from the outside of the AI device 100. For example, the input unit 140a may acquire training data for model training and input data to which the training model is applied. The input unit 140a may include a camera, a microphone, and/or a user input unit. The output unit 140b may generate output related to visual, auditory, or tactile sense. The output unit 140b may include a display unit, a speaker, and/or a haptic module. The sensing unit 140 may obtain at least one of internal information of the AI device 100, surrounding environment information of the AI device 100, and user information by using various sensors. The sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar.

The learning processor unit 140c may train a model configured as an artificial neural network using training data. The learning processor unit 140c may perform AI processing together with the learning processor unit (400 in FIG. 30) of the AI server. The learning processor unit 140c may process information received from an external device through the communication unit 110 and/or information stored in the memory unit 130. In addition, an output value of the learning processor unit 140c may be transmitted to an external device through the communication unit 110 and/or may be stored in the memory unit 130.

What is claimed is:

1. A method of performing phase noise compensation by a user equipment (UE) in a wireless communication system, the method comprising:
    receiving a data signal and a phase tracking reference signal (PTRS), wherein the data signal is received based on a first numerology and the PTRS is received based on a second numerology;
    estimating phase noise based on the PTRS; and
    performing the phase noise compensation on the data signal in a time domain based on the estimated phase noise,
    wherein a first data region in a first symbol for the first numerology is $2^n$ times longer than a second data region in a second symbol for the second numerology, where n is an integer of 1 or more,
    wherein a cyclic prefix (CP) of a third symbol in which the data signal and the PTRS are received is configured based on a sum of the first data region and the second data region,
    wherein a frequency length of a third data region in the third symbol is a same as a frequency length of the first data region, and
    wherein the third data region is expressed as a sum of the first data region and $2^n$ number of the second data regions in a time domain.

2. The method of claim 1, wherein the UE receives the data signal and the PTRS at the same time.

3. The method of claim 1, wherein the second numerology is greater than the first numerology.

4. The method of claim 3, wherein the second numerology is $2^n$ times greater than the first numerology, and wherein n is an integer of 1 or more.

5. The method of claim 1, wherein a first time-frequency resource region to which the data signal is allocated and a second time-frequency resource region to which the PTRS is allocated do not overlap each other.

6. The method of claim 5, wherein the second time-frequency resource region comprises a 0 Hz resource element (RE).

7. The method of claim 6, wherein information for the first time-frequency resource region and the second time-frequency resource region is broadcast by a base station.

8. A user equipment (UE), the UE comprising:
    at least one memory storing instructions;
    at least one transceiver; and
    at least one processor coupling the at least one memory and the at least one transceiver, wherein the at least one processor execute the instructions,
    wherein the at least one processor:
        receives a data signal and a phase tracking reference signal (PTRS), wherein the data signal is received based on a first numerology and the PTRS is received based on a second numerology;
        estimates phase noise based on the PTRS; and
        performs phase noise compensation on the data signal in a time domain based on the estimated phase noise,
    wherein a first data region in a first symbol for the first numerology is $2^n$ times longer than a second data region in a second symbol for the second numerology, where n is an integer of 1 or more,
    wherein a cyclic prefix (CP) of a third symbol in which the data signal and the PTRS are received is configured based on a sum of the first data region and the second data region,
    wherein a frequency length of a third data region in the third symbol is a same as a frequency length of the first data region, and
    wherein the third data region is expressed as a sum of the first data region and $2^n$ number of the second data regions in a time domain.

9. The UE of claim 8, wherein the UE has a Fast Fourier Transformation (FFT) block dedicated to the data signal and a FFT block dedicated to the PTRS.

10. An apparatus configured to control a user equipment (UE), the apparatus comprising:
    at least one processor; and
    at least one memory operably connected to the at least one processor,
    wherein the at least one memory stores instructions that, based on being executed by the at least one processor, cause the at least one processor to perform operations comprising:
        receiving a data signal and a phase tracking reference signal (PTRS), wherein the data signal is received based on a first numerology and the PTRS is received based on a second numerology:
        estimating phase noise based on the PTRS; and
        performing phase noise compensation on the data signal in a time domain based on the estimated phase noise,
    wherein a first data region in a first symbol for the first numerology is $2^n$ times longer than a second data region in a second symbol for the second numerology, where n is an integer of 1 or more,
    wherein a cyclic prefix (CP) of a third symbol in which the data signal and the PTRS are received is configured based on a sum of the first data region and the second data region,
    wherein a frequency length of a third data region in the third symbol is a same as a frequency length of the first data region, and
    wherein the third data region is expressed as a sum of the first data region and $2^n$ number of the second data regions in a time domain.

\* \* \* \* \*